United States Patent
Drachmann

(10) Patent No.: US 10,605,646 B2
(45) Date of Patent: Mar. 31, 2020

(54) ULTRASONIC FLOW METER WITH SUBSAMPLING OF ULTRASONIC TRANSDUCER SIGNALS

(71) Applicant: Jens Drachmann, Viby J (DK)

(72) Inventor: Jens Drachmann, Viby J (DK)

(73) Assignee: Apator Miitors ApS, Aarhus V (DK)

(*) Notice: Subject to any disclaimer, the term of this patent is extended or adjusted under 35 U.S.C. 154(b) by 419 days.

(21) Appl. No.: 15/179,221

(22) Filed: Jun. 10, 2016

(65) Prior Publication Data

US 2016/0282170 A1 Sep. 29, 2016

Related U.S. Application Data

(60) Division of application No. 13/661,954, filed on Oct. 26, 2012, now Pat. No. 9,383,239, which is a (Continued)

(30) Foreign Application Priority Data

Apr. 28, 2010 (EP) ..................................... 10161295

(51) Int. Cl.
   *G01F 1/66* (2006.01)
   *G01F 25/00* (2006.01)

(52) U.S. Cl.
   CPC .......... *G01F 25/0007* (2013.01); *G01F 1/662* (2013.01); *G01F 1/667* (2013.01); *G01F 1/668* (2013.01)

(58) Field of Classification Search
   None
   See application file for complete search history.

(56) References Cited

U.S. PATENT DOCUMENTS 4,222,352 A * 9/1980 Drews .................. F02D 41/182
                                                              123/484
4,227,407 A    10/1980 Drost
(Continued)

FOREIGN PATENT DOCUMENTS

CN        1204397 A     1/1999
CN     101334308 A    12/2008
(Continued)

*Primary Examiner* — John E Breene
*Assistant Examiner* — Brandon J Becker
(74) *Attorney, Agent, or Firm* — Lee & Hayes, P.C.

(57) ABSTRACT

An ultrasonic flow meter is disclosed, including a switching unit for switching electrical transmission signals between a signal generator and at least two ultrasonic transducers and for switching electrical reception signal between the transducers and a receiver circuit, wherein the switching unit is coupled to an output terminal of an operational amplifier of the signal generator and to an inverting input terminal of an operational amplifier of the receiver circuit. Furthermore, a method for characterizing an ultrasonic transducer is disclosed, including the step of determining directly from one or more supply current signals for an active component of a signal generator one or more quantities useful for characterizing the transducer. Furthermore, a method for determining the time delay of an ultrasonic signal in a flow path of an ultrasonic flow meter is disclosed, including the step of comparing physically transmitted, delayed and received signals with simulated non-delayed signals.

27 Claims, 29 Drawing Sheets

Related U.S. Application Data continuation of application No. PCT/DK2011/050131, filed on Apr. 26, 2011.

(56) References Cited

U.S. PATENT DOCUMENTS

| | | | | |
|---|---|---|---|---|
| 4,384,491 | A * | 5/1983 | Brown | G01F 1/667 73/861.28 |
| 4,501,247 | A * | 2/1985 | Gassler | F02D 41/06 123/179.17 |
| 4,509,373 | A | 4/1985 | Brown | |
| 4,762,012 | A | 8/1988 | Brown | |
| 5,305,239 | A | 4/1994 | Kinra | |
| 5,629,680 | A * | 5/1997 | Makhija | G01R 31/006 324/433 |
| 5,741,980 | A | 4/1998 | Hill et al. | |
| 6,294,954 | B1 * | 9/2001 | Melanson | H03F 1/32 326/83 |
| 6,305,233 | B1 * | 10/2001 | Braathen | G01F 1/667 73/861.28 |
| 6,508,135 | B1 * | 1/2003 | Martin | G01F 1/667 73/861.28 |
| 6,829,948 | B2 | 12/2004 | Nakabayashi et al. | |
| 2002/0002335 | A1 * | 1/2002 | Doten | A61B 8/06 600/454 |
| 2003/0200817 | A1 * | 10/2003 | Suginouchi | G01F 1/667 73/861.23 |
| 2003/0209083 | A1 | 11/2003 | Nakabayashi et al. | |
| 2004/0107779 | A1 | 6/2004 | Kishimoto et al. | |
| 2008/0297171 | A1 * | 12/2008 | Ruppel | H03F 1/30 324/607 |
| 2008/0307895 | A1 * | 12/2008 | Zhang | G01F 1/667 73/861.27 |
| 2009/0000392 | A1 | 1/2009 | Zhou et al. | |
| 2009/0000394 | A1 | 1/2009 | Opitz et al. | |
| 2009/0007625 | A1 | 1/2009 | Ao et al. | |
| 2009/0019945 | A1 * | 1/2009 | Matsushita | G01F 1/667 73/861.28 |
| 2010/0137779 | A1 * | 6/2010 | Seitz | A61N 1/30 604/20 |

FOREIGN PATENT DOCUMENTS

| | | |
|---|---|---|
| DE | 19613311 A1 | 10/1997 |
| EP | 0846936 A1 | 6/1998 |
| EP | 1361417 A2 | 11/2003 |
| EP | 1438551 A1 | 7/2004 |
| EP | 2009410 A1 | 12/2008 |
| EP | 2101160 A1 | 9/2009 |
| FR | 1355584 A | 3/1964 |
| GB | 1551742 A | 8/1979 |
| GB | 2017914 A | 10/1979 |
| GB | 2022255 A | 12/1979 |
| JP | 2004157083 A | 6/2004 |
| JP | 2006017568 A | 1/2006 |
| WO | 9504258 A1 | 2/1995 |
| WO | WO9714936 | 4/1997 |
| WO | 03036240 A1 | 5/2003 |
| WO | 2009034568 A1 | 3/2009 |

* cited by examiner

ULTRASONIC FLOW METER WITH SUBSAMPLING OF ULTRASONIC TRANSDUCER SIGNALS

FIELD OF THE INVENTION

The present invention relates to an ultrasonic flow meter for measuring the flow of a fluid, in particular within the field of transit time flow metering.

BACKGROUND OF THE INVENTION

Generally speaking, flow metering by means of the transit time method includes placing two ultrasonic transducers with a suitable mutual distance in the flow path in which the flow of a fluid is to be measured. An ultrasound signal, typically of a frequency of a few megahertz and a duration of a few microseconds, is transmitted through the fluid from the first transducer to the second transducer, and a first transmit time is recorded. Next, a similar ultrasound signal is transmitted through the fluid in the opposite direction, i.e. from the second transducer to the first transducer, and a second transmit time is recorded. Knowing the physical distance between the two transducers, the difference between the two recorded transmit times can be used for calculating the flow rate of the fluid flowing in the flow path. However, the calculated flow rate must be corrected by means of a correction table taking into account the sound velocity and viscosity of the fluid. Both of those characteristics being dependent on the temperature, a correction table with correction values depending on the temperature is sufficient when the type of fluid is known.

One problem to be faced when working with this type of flow meters is that the transducer parameters are not only very likely to differ between samples but also change over time and when the temperature changes. Such differences and changes alter the shape of the received signal, making it difficult to use this shape as basis for the calculation of the absolute transit time.

During the last 25 years, ultrasonic flow metering has seen a dramatic development from low volume laboratory instruments to standard equipment produced in very high volume. Technical and commercial challenges have been overcome to a degree that the technology is now competitive against most other methods including mechanical meters in many areas of flow metering. For instance, highly accurate flow meters produced in high volumes are now commonly used as water meters, heat meters, gas meters and other meters used for billing.

Some of the challenges still to be worked on are improving the meters so that they are less sensitive to electrical and acoustical noise while still keeping the meters stable and producible and without sacrificing cost and power consumption. Sensitivity to noise can be decreased by increasing the signal to noise ratio, the most effective method being increasing the signal.

Typical acoustical noise sources in an ultrasonic flow meter are edges in the flow current and external vibrations, both producing a fixed acoustical noise level independent of the ultrasound generated by the meter itself. The sensitivity to the acoustical noise can be reduced by increasing the acoustical signal produced by the transducers or by changing the physical shape of the flow meter.

Electrical noise in an ultrasonic flow meter has many sources, such as thermal noise, externally induced (by electromagnetic, electric or magnetic fields or by wire) voltages and currents, or internally induced (from other signals or clocks in the electric circuit) cross coupling, some of which are signal level dependent and some of which are independent of the signal level. The most effective way to reduce the sensitivity to electrical noise is by increasing the electrical signals involved and by keeping impedances of electrical nodes as low as possible in order to reduce the influence of the sources of electrical noise.

Many different electrical circuits relating to these subjects are known in the art, such as GB 2 017 914 (Hemp), U.S. Pat. No. 4,227,407 (Drost), DE 196 13 311 (Gaugler), U.S. Pat. No. 6,829,948 (Nakabayashi), EP 0 846 936 (Tonnes) and EP 1 438 551 (Jespersen), each having strengths and weaknesses.

The two last-mentioned documents (Tonnes and Jespersen) show transducer couplings having the benefit that the impedance as seen from the transducers is the same in the transmit situation and in the receive situation. Discussions in the two patent documents explain that this feature is a prerequisite for the whole flow meter to demonstrate stability and producibility in real life situations, i.e. without unrealistic requirements on matching between components in the meter. The reason for this fact is that the exact impedance match allows the flow meter to fully exploit the reciprocity theorem.

Although the connection between reciprocity and stable flow metering has been known for many years, the couplings shown in these patent documents are the only practical ways, known to date, that fully achieve absorbing the natural tolerances of piezoelectric ultrasonic transducers so that producible and stable flow meters can be produced.

The transducer couplings shown in both of these two documents comprise an impedance, which has the function of converting the current signal received from the transducer to a measurable voltage signal. Unfortunately, as explained in further detail below, this impedance also limits the electrical signal that can be supplied to the transducers, and in order to produce in the largest possible received voltage signal, the size of the impedance is restricted to be in the range between 0.5 and 2 times the impedance of the ultrasonic transducers at the frequency of interest.

Nakabayashi (U.S. Pat. No. 6,829,948) has another approach, in which the generator and the receiver are implemented by two different means, but in this configuration, the received signal strength is sacrificed for stable results at changing transducer parameters.

It is an object of the present invention, which is described in the following, to overcome the above-identified problems and to provide a stable, producible flow meter, which is capable of transmitting a high acoustical signal.

SUMMARY OF THE INVENTION

The present invention relates to a method for determining the absolute transit time of an ultrasonic signal in a flow path of an ultrasonic flow meter comprising two ultrasonic transducers, said method comprising the steps of:
monitoring a current to an active component of a signal generator driving a transducer from one or more voltage supplies during and after a feeding of an input signal to the signal generator, thus obtaining a supply current signal for the transducer,
emulating a flow meter response similar to an output signal from a receiver circuit of the flow meter as the output signal would be, if there was no time delay in the transmission of an ultrasonic signal between the two ultrasonic transducers, comparing the emulated flow meter response to a measured flow meter response actually received by the receiver circuit, and calculating the absolute transit time as the time difference between the emulated flow meter response and the measured flow meter response.

Such a method has shown to be efficient and result in very precise determination of the absolute transit time as compared to previously known methods.

In an embodiment of the invention, the step of emulating a flow meter response comprises:

feeding a single pulse input signal to a signal generator driving a transducer, said signal generator comprising an active component, monitoring the current to the active component from one or more voltage supplies during and after the feeding of the input signal to the signal generator, thus obtaining a single pulse supply current signal for the transducer, adjusting the single pulse supply current signal and for obtaining an emulated single pulse response of the transducer, repeating the three previous steps for the other transducer, thus obtaining another emulated single pulse response, finding the single pulse response of the system by making a convolution of the two obtained single pulse responses of the transducers, and calculating the emulated flow meter response by combining a number of instances of the found single pulse response of the system, which are repeated with suitable delays.

This has shown to be an efficient way of obtaining emulated flow meter responses very similar to the measured flow meter responses.

In an embodiment of the invention, the step of emulating a flow meter response comprises:

feeding a pulsating input signal to a signal generator driving a transducer, said signal generator comprising an active component, monitoring the current to the active component from one or more voltage supplies during and after the feeding of the input signal to the signal generator, thus obtaining one or more supply current signal, determining directly from the obtained one or more supply current signal or from one or more resulting signals derived from the one or more obtained supply current signal one or more quantities useful for characterizing the transducer, repeating the three previous steps for the other transducer, thus obtaining similar quantities useful for characterizing the other transducer, using the determined characteristic quantities of the transducers for finding an equivalence model of the transducers and establishing a numerical simulation model of the transducers and electronic circuits of a signal generator and/or a receiver circuit of the flow meter, and simulating the flow meter system by entering an input signal function or a sampled version of a physical transmission signal reaching the first transducer into the numerical simulation model, thereby obtaining the emulated flow meter response.

This is another efficient way of obtaining emulated flow meter responses very similar to the measured flow meter responses.

In an embodiment of the invention, the quantities useful for characterizing the transducer include an oscillation period and/or a damping coefficient determined from at least a part of one or more of the obtained signals and/or the derived signals, said signal part representing a dampened oscillation.

The oscillation period and the damping coefficient relating to a dampened oscillation of the transducer are very useful characteristics of the transducers, which are very suitable for constructing an adequate equivalence model of the transducers.

In an embodiment of the invention, the one or more supply current signals are obtained by monitoring the voltage across one or more current sensing resistors being arranged in series between the active component of the signal generator and one or more voltage supplies of the signal generator.

This is a simple, stable and well-known method for measuring a current signal.

In an embodiment of the invention, the step of calculating the absolute transit time comprises:

transforming the emulated flow meter response and the measured flow meter response into the frequency domain, for instance by means of Fast Fourier Transformation, determining the phase angle between the two flow meter responses in the frequency domain for at least two different frequencies, and determining the absolute transit time by calculating the group time delay from the two determined phase angles.

The use of Fast Fourier Transformation and working in the frequency domain substantially reduces the amount of calculation needed to determine the absolute transit time.

In an embodiment of the invention, the step of calculating the absolute transit time comprises:

finding filtered envelopes of the emulated flow meter response and the measured flow meter response, respectively, identifying the two points in time, in which the filtered envelopes have reached 50% of their maximum value, respectively, and calculating the absolute transit time as the time difference between the two identified points in time.

This method has shown to provide a very precise determination of the absolute transit time of the ultrasonic signal passing through the flow path of the flow meter.

In an aspect of the invention, it relates to an ultrasonic flow meter comprising at least one ultrasonic transducer and a signal generator for generating electrical signals to the transducer, the signal generator comprising an active component, wherein the flow meter further includes means for measuring one or more power supply currents to the active component of the signal generator.

This enables for the possibility of characterising the transducers while they are arranged in the flow meter.

In an embodiment of the invention, the means for measuring one or more power supply currents comprise a resistor inserted in series between the source of the positive supply voltage and the active component.

This is a simple, stable and well-known method for measuring a current signal.

In an embodiment of the invention, the means for measuring one or more power supply currents comprise a resistor inserted in series between the source of the negative supply voltage and the active component.

Measuring the supply currents in both power supply connections enables for a faster characterization of the transducers, measuring two supply current signals simultaneously.

In an aspect of the invention, it relates to a method for characterizing an ultrasonic transducer, said method comprising the steps of:
- feeding a pulsating input signal to a signal generator driving the transducer, said signal generator comprising an active component,
- monitoring the current to the active component from one or more voltage supplies during and after the feeding of the input signal to the signal generator, thus obtaining one or more supply current signal, and
- determining directly from the obtained one or more supply current signal or from one or more resulting signals derived from the one or more obtained supply current signal one or more quantities useful for characterizing the transducer.

This method enables for characterization of the transducers while they are arranged in the flow meter.

In an embodiment of the invention, the active component is an operational amplifier.

In another embodiment of the invention, the active component is a digital circuit driving the transducer.

This reflects that different types of active components can be used in the signal generator.

In an embodiment of the invention, the one or more supply current signals are obtained by monitoring the voltage across one or more current sensing resistors being arranged in series between the active component of the signal generator and one or more voltage supplies of the signal generator.

This is a simple, stable and well-known method for measuring a current signal.

In an embodiment of the invention, the quantities useful for characterizing the transducer include an oscillation period and/or a damping coefficient determined from at least a part of one or more of the obtained signals and/or the derived signals, said signal part representing a dampened oscillation.

The oscillation period and the damping coefficient relating to a dampened oscillation of the transducer are very useful characteristics of the transducers, which are very suitable for constructing an adequate equivalence model of the transducers.

In an embodiment of the invention, it relates to a method for determining the time delay of the ultrasonic signal in the flow path of an ultrasonic flow meter, said method comprising the steps of:
- characterizing two transducers of the flow meter by determining characteristic quantities, such as the angular frequency and the damping coefficient of dampened oscillations of the transducers,
- using the determined characteristic quantities of the transducers for finding an equivalence model of the transducers and establishing a numerical simulation model of the transducers and electronic circuits of a signal generator and/or a receiver circuit of the flow meter,
- simulating the flow meter system by entering an input signal function or a sampled version of a physical transmission signal reaching the first transducer into the numerical simulation model, thereby obtaining a simulation model response corresponding to the output signal from the receiver circuit as it would be according to the model, if there was no time delay in the transmission of the ultrasonic signal between the two transducers,
- recording the physical flow meter response actually received by the receiver circuit, and
- calculating the absolute transit time by determining the time delay of the physical flow meter response as compared to the simulation model response.

This method has shown to provide a very precise determination of the absolute transit time of the ultrasonic signal passing through the flow path of the flow meter.

In an embodiment of the invention, the step of calculating the absolute transit time comprises the steps of:
- finding filtered envelopes of the simulation model response and the physical flow meter response, respectively,
- identifying the two points in time, in which the filtered envelopes have reached 50% of their maximum value, respectively, and
- calculating the absolute transit time as the time difference between the two identified points in time.

This method of calculating the absolute transit time has shown to be very precise and reproducible, taking into account that the transducer parameters not only are very likely to differ between samples but also change over time and when the temperature changes.

In an aspect of the invention, it relates to an ultrasonic flow meter comprising at least one ultrasonic transducer and a signal processing unit for processing electrical signals received from the at least one ultrasonic transducer, wherein the signal processing unit is arranged to digitalize a continuous signal at a sample frequency of less than twice the resonance frequency of the at least one ultrasonic transducer.

This allows for the use of slower and cheaper analogue-digital converters in the flow meter than would otherwise be needed.

In an aspect of the invention, it relates to an ultrasonic flow meter comprising a flow path for fluid flow, at least two ultrasonic transducers acoustically coupled to the flow path, the one transducer arranged upstream of the other transducer along the flow path, a signal generator for generating electrical transmission signals to the transducers, the signal generator comprising a negative feedback coupled operational amplifier, a receiver circuit for receiving electrical reception signals from the transducers, the receiver circuit comprising a negative feedback coupled operational amplifier, a switching unit for switching electrical transmission signals between the signal generator and the transducers and for switching electrical reception signal between the transducers and the receiver circuit, a signal processing unit for providing an output indicative of the flow rate in the flow path based on the electrical reception signals, wherein the switching unit is coupled to an output terminal of the operational amplifier of the signal generator and the switching unit is coupled to an inverting input terminal of the operational amplifier of the receiver circuit.

Thus, the invention relates especially to high accuracy, high volume, low power and low cost consumption meters for billing purposes.

By coupling the switching unit, and thereby the transducers, to the output terminal of an operational amplifier of the signal generator and to the inverting input terminal of the operational amplifier of the receiver circuit, it is achieved that the impedance as seen from the transducers is the same regardless of whether the transducers are operated as transmitters or as receivers. This means that the reciprocity theorem for linear passive circuits applies for the flow meter, which is important for its stability and producibility.

In an embodiment of the invention, an output impedance of the signal generator and an input impedance of the receiver circuit are negligible compared to the impedance of the transducers, such as less than 10 Ohms, preferably less than 1 Ohm, most preferred less than 0.1 Ohm.

Choosing a very low output impedance of the signal generator SG and a very low input resistance of the receiver circuit RC is advantageous for obtaining that the transducers will experience the two impedances as being sufficiently close to each other, and for assuring that the attenuation of the electrical transmission and reception signals is minimized.

In an embodiment of the invention, the signal generator and the receiver circuit share at least one active component.

This is advantageous for saving component costs when producing the flow meter.

In an embodiment of the invention, all active components of the signal generator are completely separate from all active components of the receiver circuit.

Using different active components for the signal generator and for the receiver circuit enables for the possibility that the signal can be transmitted all the way through the flow meter without any switching over of the transmission path having to take place during the transmission.

In an embodiment of the invention, one or more of the operational amplifiers in the signal generator and the receiver circuit are current feedback operational amplifiers.

The use of current feedback amplifiers is beneficial, because such amplifiers have a lower input impedance on the inverting input terminal and a higher bandwidth and a lower power consumption and a higher gain at high frequencies than other types of operational amplifiers.

In an embodiment of the invention, one or more of the operational amplifiers in the signal generator and the receiver circuit are operated at an input common mode voltage, the AC component of which is substantially zero or at least negligible.

This is of importance for some types of operational amplifiers, especially the fastest ones with the highest bandwidth and very low current consumption, as the voltage swing allowed on the input for linear operation can be very limited.

In an embodiment of the invention, the at least two transducers are arranged to be able to transmit an ultrasound signal simultaneously.

In this configuration, the electrical transmission signal is only to be sent half as many times as in other configurations, saving battery life time. In addition, the transit time is measured simultaneously in the two directions and, thus, no sudden change of the flow velocity between measurements in the two directions can occur.

BRIEF DESCRIPTION OF THE DRAWINGS

In the following, a few exemplary embodiments of the invention are described and explained in more detail with reference to the drawings, where.

DETAILED DESCRIPTION OF THE INVENTION

Figure 1:
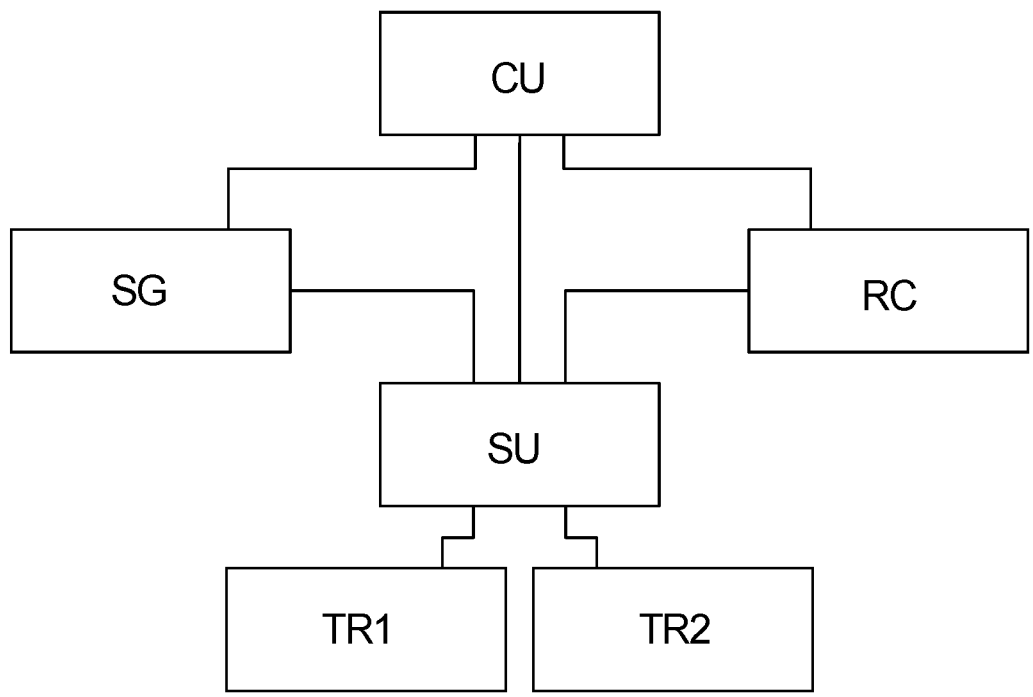
FIG. 1 illustrates schematically the overall structure of an ultrasonic flow meter for transit time flow metering as known in the art.

FIG. 1 shows the overall structure of an ultrasonic flow meter for transit time flow metering as known in the art. A controller unit CU controls the operation of a signal generator SG, a switching unit SU and a receiver circuit RC, where the switching unit SU sets up different electrical connections between the signal generator SG and the receiver circuit RC on one side and two ultrasonic transducers TR1, TR2 on the other side. The two transducers TR1, TR2 are arranged in a flow path FP, in which a fluid flow is to be metered, one transducer TR1 upstream of the other transducer TR2 along the flow path FP.

In principle, the flow metering is performed in three steps:
1. The switching unit SU is set up to connect the signal generator SG to the first transducer TR1 and to connect the second transducer TR2 to the receiver circuit RC. An electrical transmission signal, typically a pulsating signal of a frequency of a few megahertz and duration of a few microseconds, is sent from the signal generator SG through the switching unit SU to the first transducer TR1, from which the signal is transmitted as an ultrasonic signal through the fluid to the second transducer TR2. From TR2, the signal continues as an electrical current reception signal through the switching unit SU to the receiver circuit RC, in which the reception signal is converted to a voltage signal.

A signal processing unit (part of the controller unit CU in the configuration shown in FIG. 1), analyses the voltage signal, calculates the transit time of the ultrasound signal through the fluid from transducer TR1 to transducer TR2 from the delay of the electrical reception signal as compared to the electrical transmission signal, and records this transit time ($t_1$).

2. The configuration of the switching unit SU is changed to connect the signal generator SG to the second transducer TR2 and to connect the first transducer TR1 to the receiver circuit RC.

An electrical transmission signal is sent from the signal generator SG and an electrical reception signal is received by the receiver circuit RC as in step 1, only this time the ultrasonic signal is transmitted through the fluid in the opposite direction, i.e. from the second transducer TR2 to the first transducer TR1.

Again, the signal processing unit calculates and records the transit time ($t_2$).

3. The signal processing unit calculates an indication of the flow in the flow path FP from a formula of the form:

$$\Phi \propto K(t_1 - t_2, t_1 + t_2) \cdot \frac{t_1 - t_2}{(t_1 + t_2)^2} \qquad \text{(Equation 1)}$$

where $\Phi$ is the flow indication, which is proportional to the fraction shown in Equation 1 multiplied by a correction factor K found in a table of correction factors, which is determined once and for all for a given type of flow meter for a given fluid.

This table of correction factors takes into account a number of physical quantities, such as, for instance, the dimensions and physical configuration of the flow path FP in the flow meter and the viscosity of the fluid.

As can be seen from Equation 1, once the table of correction factors has been established, the flow indication can be calculated from the two quantities ($t_1-t_2$) and ($t_1+t_2$).

The first of these quantities, ($t_1-t_2$), which is the difference between the two transit times, is typically in the order of a few nanoseconds, but can easily be determined by finding the phase difference between the two reception signals. This can be done very precisely (with an accuracy of down to between 10 and 100 picoseconds) by several analogue and digital methods well-known through many years, due to the fact that the two reception signals are identical except for a phase difference due to the different transit times ($t_1$ and $t_2$), given that the reciprocity theorem for linear passive circuits applies. Generally, this is the case if it is assured that the impedance, as seen from the transducers TR1, TR2 is the same, regardless of whether the transducers TR1, TR2 are acting as transmitters or receivers of ultrasound.

On the other hand, it is very difficult to calculate accurately the other quantity, ($t_1+t_2$), which is the sum of the two transit times, typically in the order of a few microseconds, because it involves a calculation of the exact transit times ($t_1$ and $t_2$), which again requires a very precise determination of the front edge of each of the reception signals, which is by no means a simple task due to the shape of the reception signals.

Therefore, in many known flow meters, this quantity is, in fact, not calculated. Instead, it is estimated using the following equation:

$$\frac{d}{c} = t \approx t_1 \approx t_2 \qquad \text{(Equation 2)}$$

In this equation, d is the distance between the two transducers TR1, TR2 and c is the velocity of ultrasound in the actual fluid, the flow of which is being metered. For a given flow meter, d is known from the physical positions of the transducers TR1, TR2 in the flow path FP, and, for a given temperature, the velocity of ultrasound in a given fluid can be found in a table. Thus, by measuring the temperature of the fluid, an estimate of $t_1$ and $t_2$ can be found, which can then be used for estimating the quantity $(t_1+t_2)$ to be used in Equation 1.

Figure 2A:
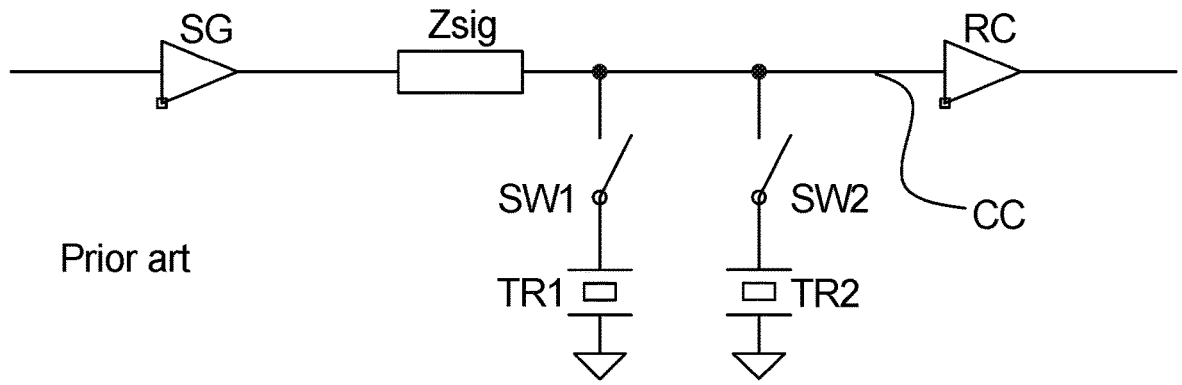
FIG. 2a illustrates schematically a coupling of ultrasonic transducers in an ultrasonic flow meter known in the art.
Figure 2B:
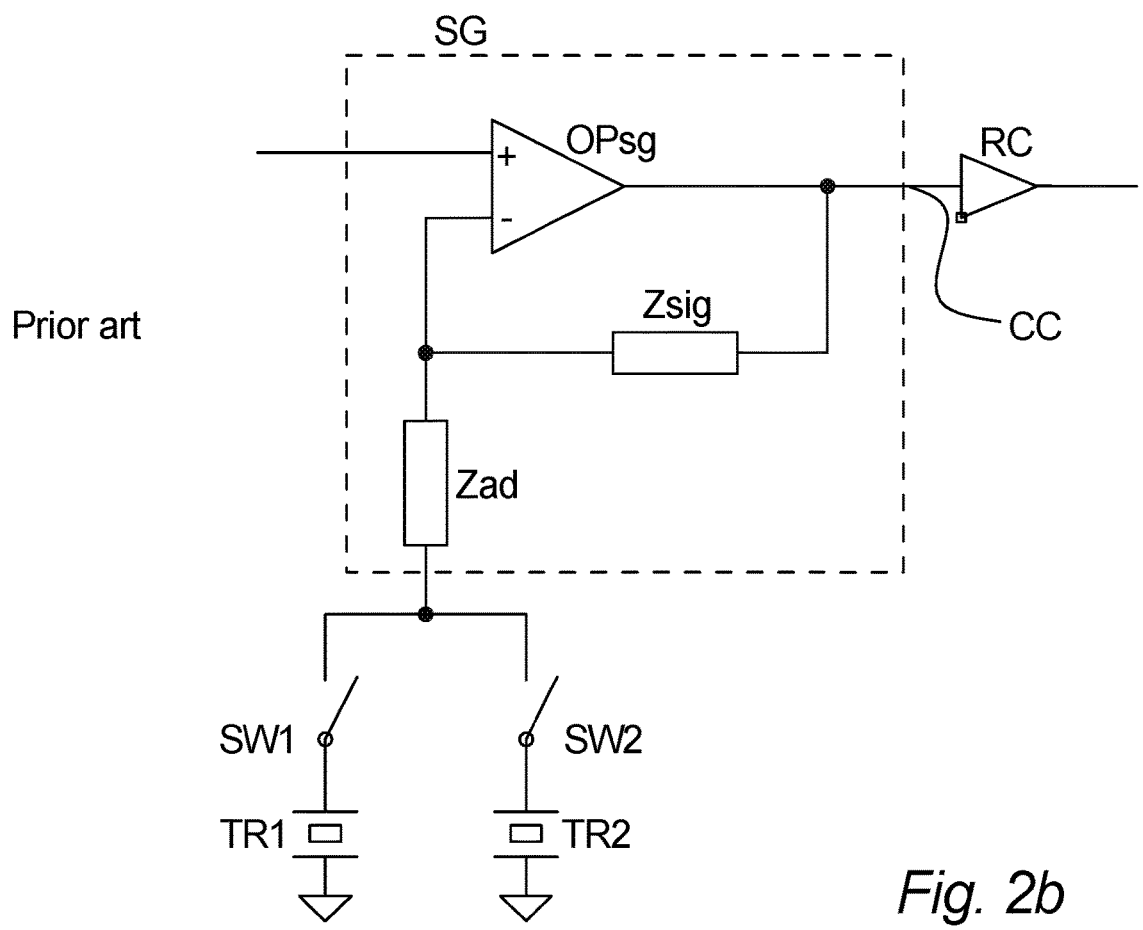
FIG. 2b illustrates schematically a coupling of ultrasonic transducers in another ultrasonic flow meter known in the art.

FIGS. 2a and 2b illustrate schematically examples of couplings of ultrasonic transducers in ultrasonic flow meters according to the inventions of Tonnes (EP 0 846 936) and Jespersen (EP 1 438 551), respectively.

Implemented correctly, both couplings assure that the reciprocity theorem for linear passive circuits applies.

In the coupling shown in FIG. 2a, the electrical transmission signal is transmitted from the signal generator SG to transducer TR1 through the signal impedance Zsig. In the coupling shown in FIG. 2b, on the other hand, the signal generator SG comprises a negative feedback coupled amplifier circuit, wherein a digital pulsating signal is connected to the non-inverting input terminal of an operational amplifier OPsg and the signal impedance Zsig forms a feedback between the output terminal and the inverting input of the operational amplifier OPsg. Transducer TR1 is connected to the inverting input terminal of the operational amplifier OPsg through an adaptation impedance Zad, which is much smaller than the signal impedance Zsig and therefore, in practice, negligible.

In both of the shown couplings, the switching unit SU comprises two switches SW1, SW2 arranged to be able to connect the two transducers TR1, TR2, respectively to a common conductor CC, which connects the signal generator SG to the receiver circuit RC. In both cases, the position of each of the switches SW1, SW2 has to be changed during the flow metering in order to assure that, at the time of transmission of the electrical transmission signal from the signal generator SG, one of the transducers TR1, TR2 is connected to the common conductor CC, whereas, at the time of reception of the electrical reception signal by the receiver circuit RC, the other transducer TR2, TR1 is connected to the common conductor CC. This change of switch positions must take place after the ultrasonic signal has left the transmitting transducer TR1, TR2, but before it reaches the receiving transducer TR2, TR1. Thus, the timing is very crucial.

The signal impedance Zsig through which the signal current will run in both of the couplings shown in FIGS. 2a and 2b has the function of converting the current signals received from the transducers TR2, TR1 to measurable voltage signals.

The size of the voltage signals is found by multiplying the received currents by the signal impedance Zsig, a large signal impedance Zsig resulting in a large received voltage signal.

Unfortunately, due to practical limitations on the supply voltage to the signal generator SG, the signal impedance Zsig also limits the electrical signal that can be supplied to the transducers TR1, TR2, because the signal impedance Zsig is also present during the transmission of a signal to the transducers TR1, TR2. Thus, the output voltage from the signal generator SG has to be larger than the signal requested on the transducers TR1, TR2. The compromise resulting in the largest received voltage signal is a value of the signal impedance Zsig in the range between 0.5 and 2 times the impedance of the ultrasonic transducers TR1, TR2 at the frequency of interest.

The present invention, on the other hand, provides a stable, producible flow meter, which is capable of transmitting a high acoustical signal, at the same time amplifying the received current signal by a high signal impedance and having a low impedance at sensitive nodes in the circuitry.

The basic idea in the present invention is to connect the transducers TR1, TR2 to different nodes in the transmit and receive situation making sure that the reciprocity theorem for linear passive circuits still applies, i.e. without sacrificing the characteristic that the impedance as seen from the transducer TR1, TR2 is the same regardless of whether the transducer TR1, TR2 is operated as a transmitter or as a receiver.

Figure 3:
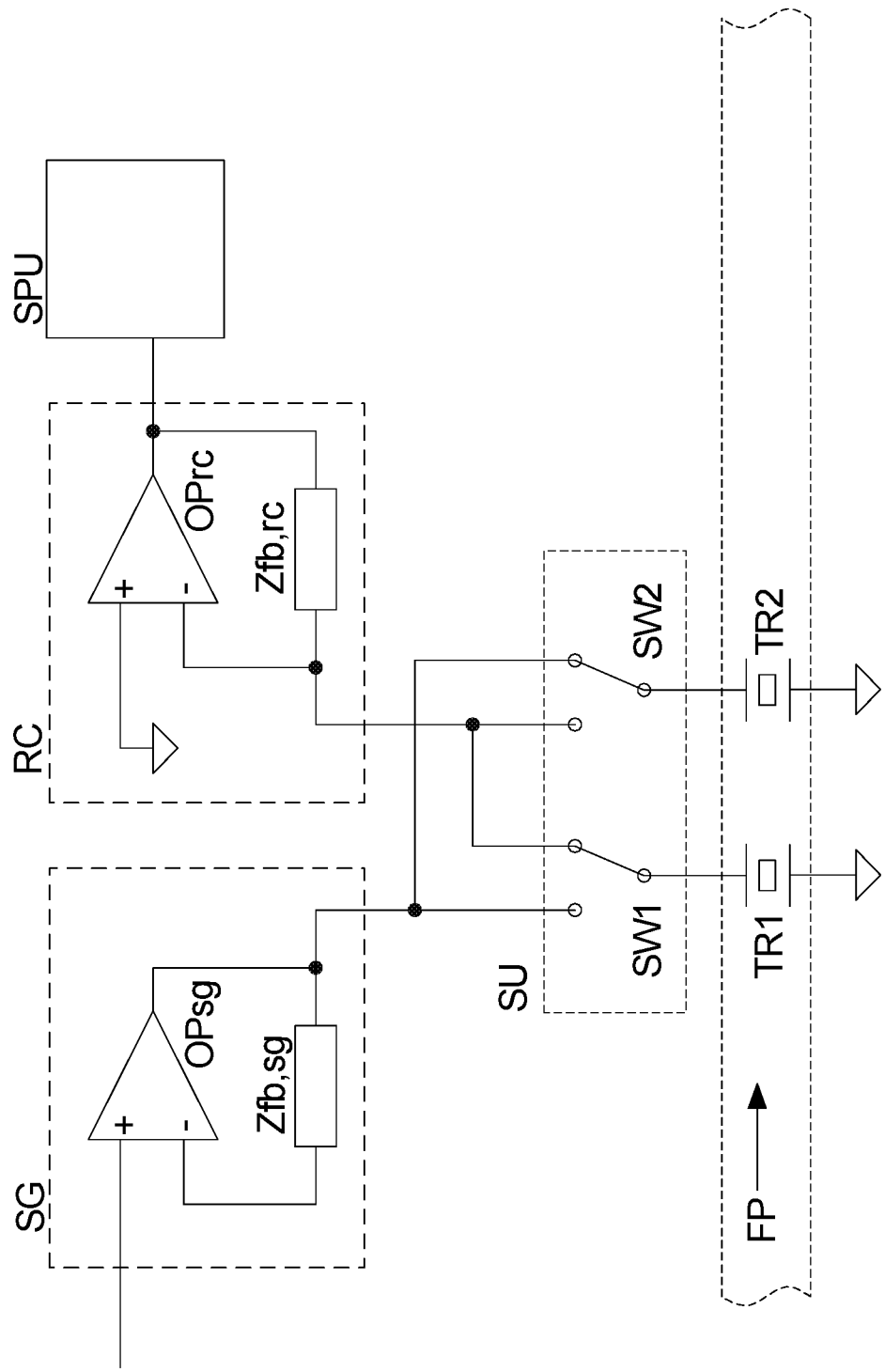
FIG. 3 illustrates schematically a coupling of ultrasonic transducers in an ultrasonic flow meter according to an embodiment of the invention.

This is achieved by coupling the switches SW1, SW2 of the switching unit SU to the output terminal of an operational amplifier OPsg of the signal generator SG and to the inverting input terminal of the operational amplifier OPrc of the receiver circuit RC as illustrated schematically in FIG. 3, which shows an embodiment of the present invention.

By using an operational amplifier OPsg with a very low output impedance in the signal generator SG and by choosing feedback components resulting in appropriate feedback impedances Zfb,sg, Zfb,rc for constructing negative feedback circuits for the two operational amplifiers OPsg, OPrc, respectively, it is possible to obtain a signal generator SG with a very low output impedance and a receiver circuit RC with a very low input impedance, at the same time accounting for the parasitic components of the operational amplifiers OPsg, OPrc. The very low impedances are obtained by coupling operational amplifiers with a very high gain at the frequency of interest with a negative feedback.

Choosing a very low output impedance of the signal generator SG and a very low input resistance of the receiver circuit RC is advantageous for at least four reasons:

First of all, if these impedances are both sufficiently low as compared to the impedances of the transducers TR1, TR2, and the parasitic components are accounted for, then, even though there may actually be a minimal difference between the output impedance of the signal generator SG and the input impedance of the receiver circuit RC, the transducers TR1, TR2 will experience the two impedances as being sufficiently close to each other. This means that, substantially, the reciprocity theorem for linear passive circuits applies, and the flow meter is stable and producible.

For a proper implementation, the output impedance of the signal generator SG and the input impedance of the receiver circuit RC should both be negligible compared to these transducer impedances, i.e. less than 1%, preferably less than 0.1%, of the transducer impedances. Depending on the transducer size and material and on the frequency of the transmitted signal, the transducer impedances at the frequencies of interest normally fall within the range from 100 Ohms to 1000 Ohms.

Secondly, the choice of small output and input impedances assures that the attenuation of the electrical transmission and reception signals is minimized, maximizing the output signal received by the receiver circuit RC.

Thirdly, very low impedances are chosen because midrange values can be hard to match within negligible tolerances in different parts of the circuits, especially as it is the complex impedance and not just the absolute resistance value that has to be taken into account.

Fourthly, a low circuit impedance is less susceptible to interference from external noise sources.

An obvious advantage of the coupling shown in FIG. 3 is that by using two different operational amplifiers OPsg, OPrc in the signal generator SG and in the receiver circuit RC, respectively, no switching is necessary between the transmission and the reception of the ultrasonic signal between the two transducers TR1, TR2. When the switches SW1, SW2 are in the positions as shown in FIG. 3, the electrical transmission signal will pass from the signal generator SG through the second switch SW2 to the second transducer TR2, from which the ultrasonic signal will be transmitted to the first transducer TR1 through the flow path (FP), whereupon the electrical reception signal will reach the receiver circuit RC from the first transducer TR1 through the first switch SW1. In order to transmit the ultrasonic signal in the opposite direction, the positions of both switches SW1, SW2 must be inverted, and again the signal can be transmitted all the way from the signal generator SG to the receiver circuit RC without any switching taking place during the transmission. In this way, switching noise is avoided and a more accurate metering may be performed.

It is known from the art that separate circuits have been used for constructing the signal generator and the receiver circuit. In these cases, however, either the transducers experience different impedances in transmit and receive situations, the amplification factors are different for the two transducers, the invention is not sufficiently disclosed to be more than theoretical, or a high impedance has been chosen.

The latter has the disadvantage that designing a signal generator having an output impedance very much (100 to 1000 times) larger than the transducer impedances at the frequencies of interest (100 kHz to 10 MHz) is very challenging. It also has the disadvantage that the optimization of the output signal amplitude has to take into account the transducer impedances for obtaining optimal signal levels. This is not trivial as the impedances of ultrasonic transducers most often dependent on the temperature and differ among samples. Last but not least, such an approach is more sensitive to electrical noise.

In recent years, new types of operational amplifiers have been designed that make the very low impedances feasible, even in battery operated flow meters. Especially, the so-called current feedback operational amplifiers, which have a lower input impedance on the inverting input terminal but also have a higher bandwidth and a lower power consumption and a higher gain at high frequencies than other types of operational amplifiers, are beneficial for use in the present invention.

Figure 4:
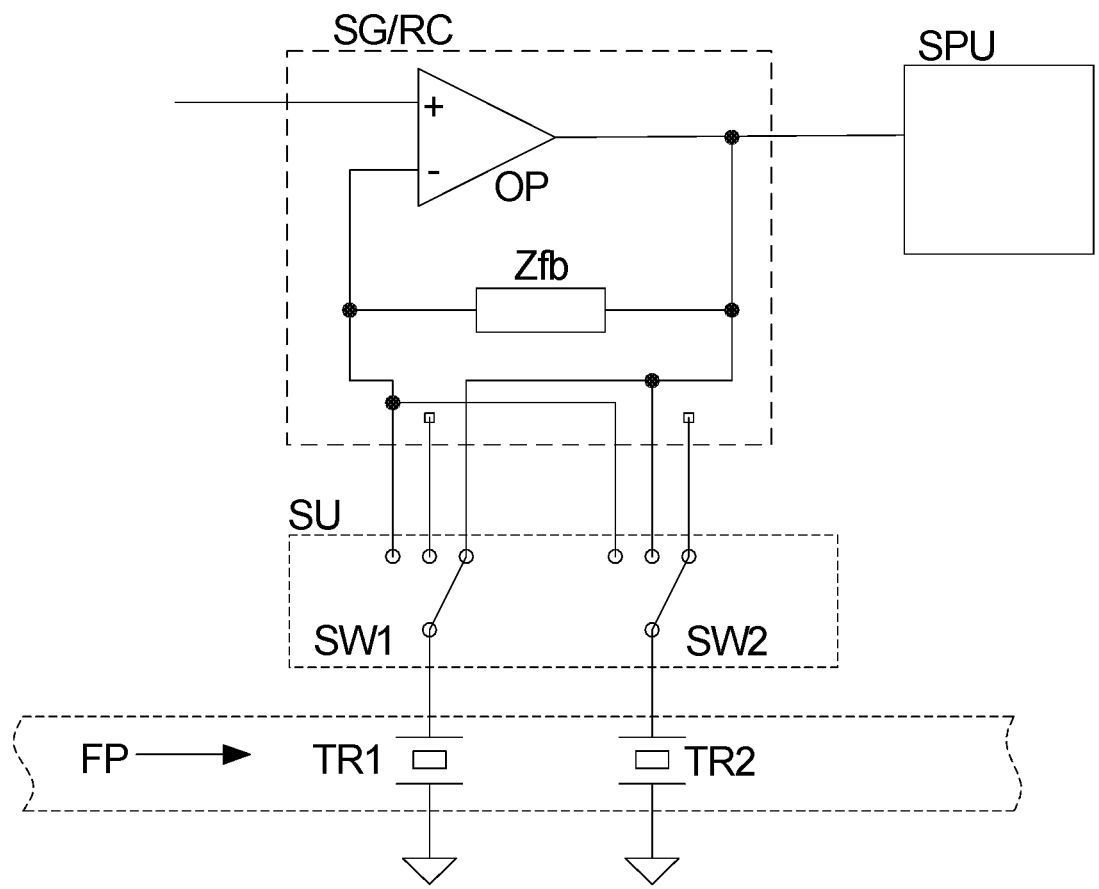
FIG. 4 illustrates schematically a coupling of ultrasonic transducers in an ultrasonic flow meter according to another embodiment of the invention.

FIG. 4 illustrates schematically a coupling of ultrasonic transducers in an ultrasonic flow meter according to another embodiment of the invention, in which the same circuit is used as signal generator SG and as receiver circuit RC. The obvious advantage of this embodiment is that only one common operational amplifier OP and, consequently, also only one set of feedback components for providing the desired resulting feedback impedance Zfb are needed.

The price to be paid for this cost saving is that a switching of the signal way is needed during the transmission of the signal. As can be seen from FIG. 4, the two switches SW1, SW2, which connect the two transducers TR1, TR2, respectively, to the combined signal generator and receiver circuit SG/RC, each have three possible positions.

This means that each of the two transducers TR1, TR2 can be:

1. set up to be the transducer to transmit the ultrasonic signal by being coupled to the output terminal of the operational amplifier OP, from which it is to receive the electrical transmission signal, the common circuit SG/RC being operated as a signal generator,
2. set up to be the transducer to receive the ultrasonic signal by being coupled to the inverting input terminal of the operational amplifier OP, to which it is to transmit the electrical reception signal, the common circuit SG/RC being operated as a receiver circuit, or
3. disconnected from the common circuit SG/RC whenever the other transducer is connected to the common circuit.

Thus, by setting and changing the positions of the switches SW1, SW2 appropriately at the right times, the desired signal paths of the electrical transmission signal, the ultrasonic signal and the electrical reception signal can be obtained. For transmitting an ultrasonic signal from the first transducer TR1 to the second transducer TR2, the first transducer TR1 is first set up to transmit the ultrasonic signal by connecting it to the common circuit SG/RC being operated as a signal generator while the second transducer TR2 is disconnected from the common circuit SG/RC. Subsequently, when the ultrasonic signal has been transmitted by the first transducer TR1 but before it reaches the second transducer TR2, the first transducer TR1 is disconnected from the common circuit SG/RC and the second transducer TR2 is set up to receive the ultrasonic signal by connecting it to the common circuit SG/RC being operated as a receiver circuit. For transmitting the ultrasonic signal in the opposite direction, the connections of the two transducers TR1, TR2 is simply swapped as compared to the above description.

Figure 5:
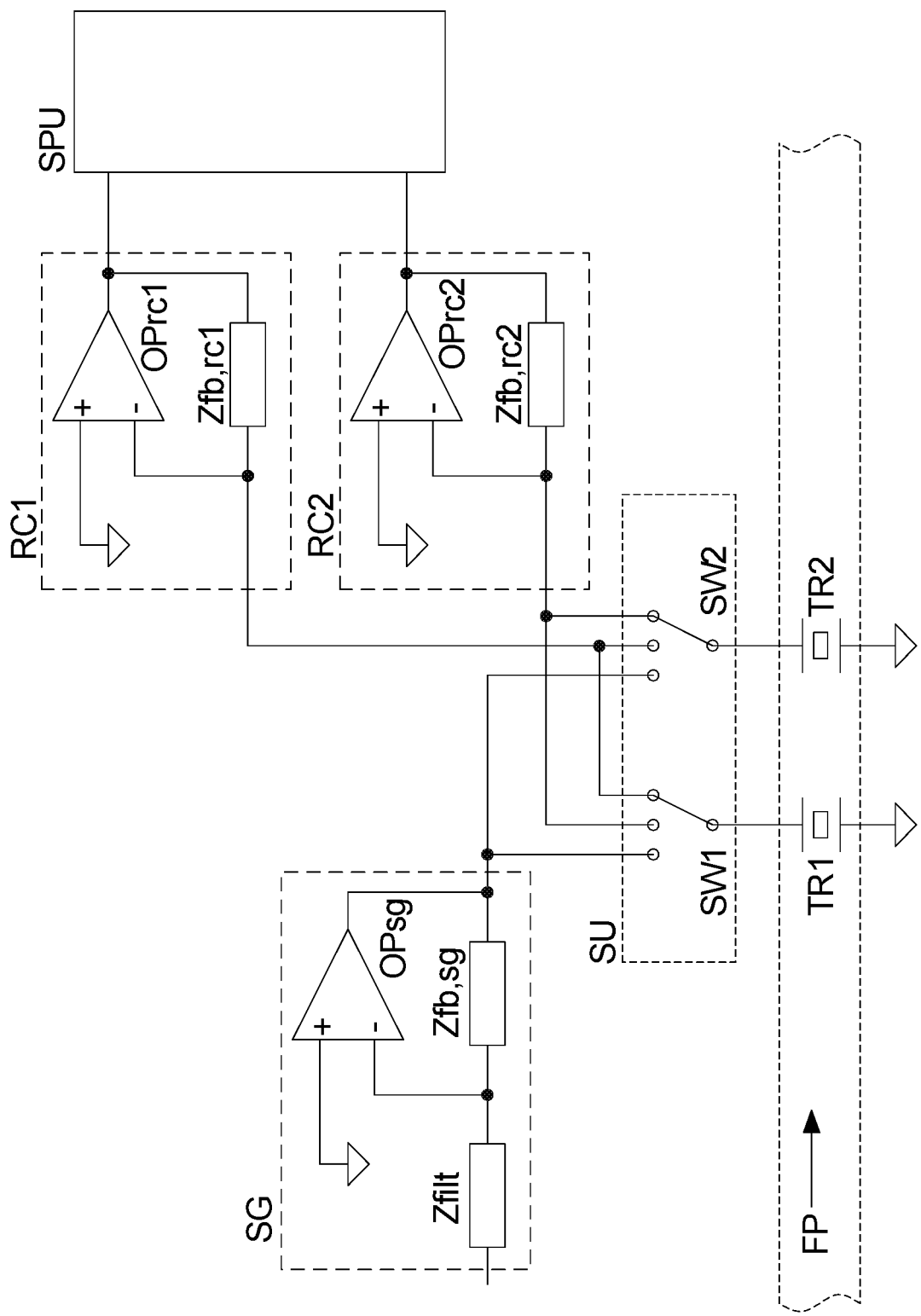
FIG. 5 illustrates schematically a coupling of ultrasonic transducers in an ultrasonic flow meter according to yet another embodiment of the invention.

FIG. 5 illustrates schematically a coupling of ultrasonic transducers in an ultrasonic flow meter according to yet another embodiment of the invention. In this case, there are two receiver circuits RC1, RC2, each comprising an operational amplifier OPrc1, OPrc2 and a negative feedback circuit with impedances Zfb,rc1 and Ffb,rc2, respectively. This allows the two transducers TR1, TR2 to transmit an ultrasound signal simultaneously.

In order to do this, both of the transducers TR1, TR2 are first connected to the signal generator SG by setting the switches SW1, SW2 in the appropriate positions. An electrical transmission signal is transmitted simultaneously to the two transducers TR1, TR2, from which it is transmitted into the flow path (FP) as an ultrasonic signal from each of the transducers TR1, TR2. Before the ultrasonic signal from the first transducer TR1 reaches the second transducer TR2 and vice versa, the positions of the switches SW1, SW2 are changed so that each of the transducers TR1, TR2 is connected to one of the receiver circuits RC1, RC2.

In this way, the ultrasonic signal can be sent both upstream and downstream along the flow path FP in a single operation. However, in order to level out any possible minor metering errors due to the fact that the two receiver circuits RC1, RC2 cannot be constructed to be completely identical, it should be assured that for every transmission of the ultrasonic signals, the connections between the transducers TR1, TR2 and the receiver circuits RC1, RC2 are interchanged, so that a given transducer TR1, TR2 is only connected to the same receiver circuit RC1, RC2 every second time.

Another difference in the coupling shown in FIG. 5 as compared to the couplings shown in the previous figures is that the digital pulsating signal is connected to the inverting input terminal of the operational amplifier OPsg of the signal generator SG through a filter impedance Zfilt, which is of influence on the amplification and the filtration of the electrical transmission signal, while the non-inverting input terminal of the operational amplifier OPsg is grounded.

Compared to the configuration of the signal generators SG shown in the previous figures, in which the input common mode voltage of the operational amplifier will exhibit some variation as the digital pulsating signal varies, this configuration has the advantage that the input common mode voltage is kept at a constant DC level. This is of importance for some types of operational amplifiers, especially the fastest ones with the highest bandwidth.

Figure 6:
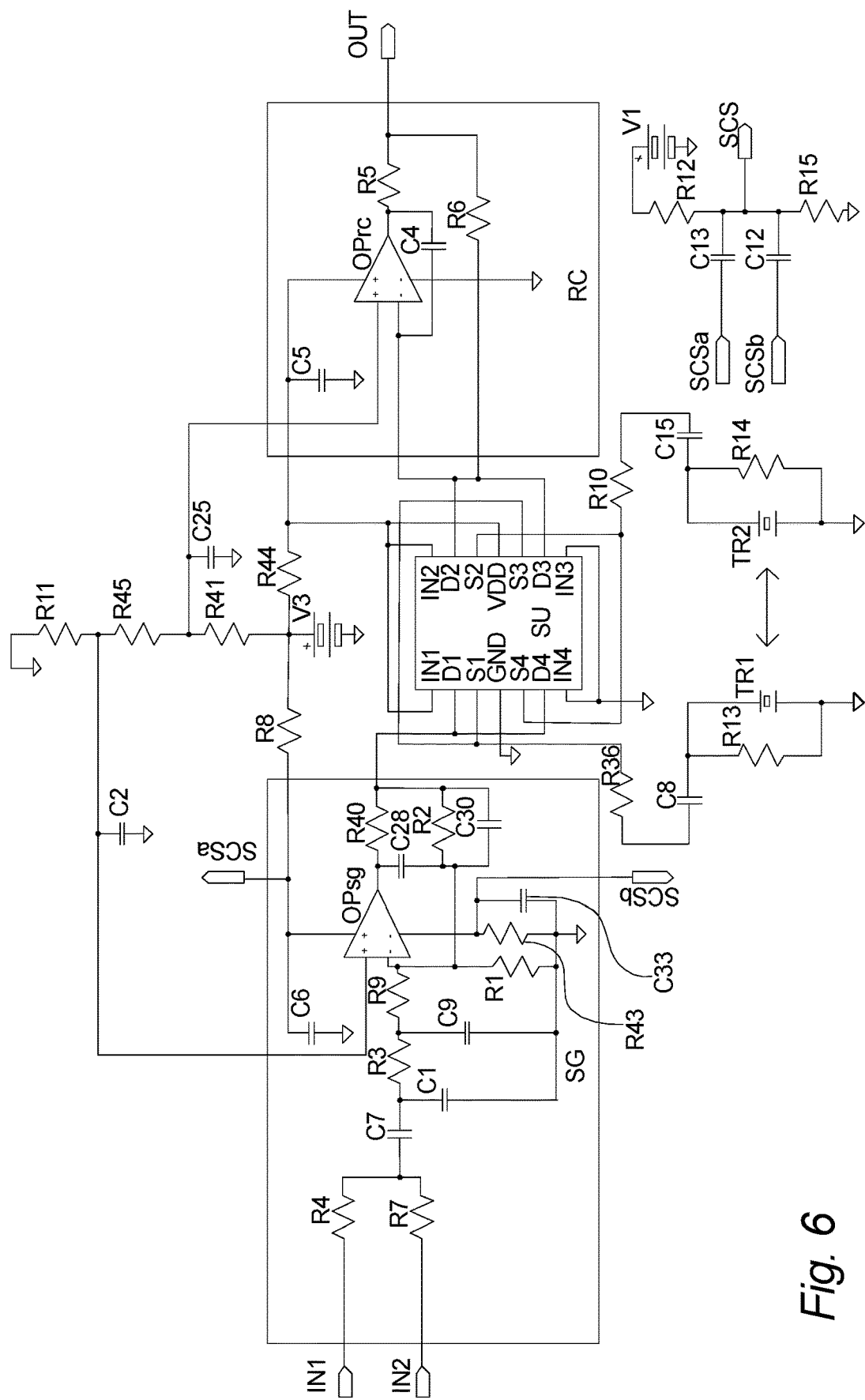
FIG. 6 shows a diagram of most of the essential electronic components in an ultrasonic flow meter according to an embodiment of the invention.

FIG. 6 shows a diagram of most of the essential electronic components in an ultrasonic flow meter according to an embodiment of the invention.

In this diagram, the two inputs marked IN1 and IN2 indicate the input of two digital pulsating signals, the two resistors R4 and R7 are there for generating a symmetric transmission signal to the signal generator SG from the two digital signals, and the capacitor C7 forms an AC coupling between the incoming transmission signal and the signal generator SG.

The two resistors R3 and R9 and the two capacitors C1 and C9 form a low-pass filter for the incoming transmission signal (corresponding to Zfilt in FIG. 5).

OPsg is the operational amplifier of the signal generator SG, which not only amplifies the incoming transmission signal, but also is important for adjusting the output impedance of the signal generator SG to be very low, i.e. substantially zero.

The three resistors R1, R2 and R40 and the two capacitors C29 and C30 together constitute the negative feedback impedance of the operational amplifier OPsg (corresponding to Zfb,sg in FIGS. 3 and 5).

The three resistors R11, R41 and R45 together form a voltage divider defining the reference voltages on the non-inverting inputs of OPsg and OPrc. Because OPsg and OPrc are both configured as inverting amplifiers, the reference voltages are the same as the input common mode voltages on the two operational amplifiers OPsg and OPrc, respectively. The reference voltages to the two operational amplifiers OPsg and OPrc are decoupled by the two capacitors C2 and C25.

V3 (corresponding to VCC in FIGS. 7a and 7b) is the positive supply voltage for the circuit. In low-power consumption flow meters, such as battery operated flow meters, V3 can advantageously be cut off with a switch (not shown) most of the time, so that the circuit is operated at a very low duty cycle.

In the embodiment shown in FIG. 6, the switching unit SU comprises four switches implemented on a single CMOS die in an integrated circuit for coupling of the transducers TR1, TR2 to the signal generator SG and the receiver circuit RC. The pins IN1-IN4 of the switching unit SU each controls one of the four switches connected between the lines D1-S1, D2-S2, D3-S3 and D4-S4, respectively, by asserting a high voltage. In the diagram shown in FIG. 6, the switches are configured to transmit a signal from transducer TR1 to transducer TR2. For a signal to be transmitted from transducer TR2 to transducer TR1, opposite voltages must be applied to IN1-IN4. Preferable, IN1-IN4 are controlled by a microcontroller.

The two resistors R10 and R36 are small current limiting resistors. The stability of the operational amplifiers OPsg and OPrc is increased by limiting the capacitive load on the amplifiers OPsg, OPrc.

The two capacitors C8 and C15 provide an AC coupling of the signals to and from the transducers TR1, TR2. This allows the use of single supply voltage operational amplifiers OPsg, OPrc as the ones shown in FIG. 6 without any DC voltage on the transducers TR1, TR2.

The two resistors R13 and R14 are bleeders for discharge of the transducers TR1, TR2 in case a charge is produced thereon due to pyroelectric effects or due to other circumstances.

The two ultrasonic transducers TR1 and TR2 are preferably constituted by piezoelectric transducers.

OPrc is the operational amplifier of the receiver signal RC, which produces an amplified output signal OUT from the electrical reception signal from the transducers TR1, TR2, but also is important for adjusting the input impedance of the receiver circuit RC to be very low, i.e. substantially zero.

The resistor R44 and the capacitor C5 constitute a filtering of the supply voltage for the operational amplifier OPrc of the receiver circuit RC.

The two resistors R5 and R6 and the capacitor C4 together constitute the negative feedback impedance of the operational amplifier OPrc (corresponding to Zfb,rc in FIG. 3).

The two resistors R8 (corresponding to RCC in FIGS. 7a and 7b) and R43 are used for current sensing of the power supply currents to the operational amplifier OPsg. In some embodiments of the invention, R43 may be omitted for increased stability. If OPsg is chosen to be an operational amplifier with low supply voltage rejection ratio, switches (not shown) are needed to short-circuit R8 and R43 during transit time measurements.

The two capacitors C6 and C33 have the purpose of decoupling the supply voltages to OPsg. If the values of these two capacitors are too high, the voltages across R8 and R43 do not properly reflect the power supply currents to the operational amplifier OPsg. If, on the other hand, the values of C6 and C33 are too low, the operational amplifier OPsg is potentially unstable.

The two capacitors C13 and C14 and the two resistors R12 and R15 are components needed to combine the two supply current signals SCSa, SCSb into a single signal supply current signal SCS. R12 and R15 also define the DC voltage level for following circuits of the flow meter, such as an Analogue-Digital converter.

V1 is a supply voltage needed to generate the DC voltage level for the combining circuitry C13, C14, R12, R15. By careful selection of components, V3 may be reused in place of the separate supply voltage V1.

Figure 7A:
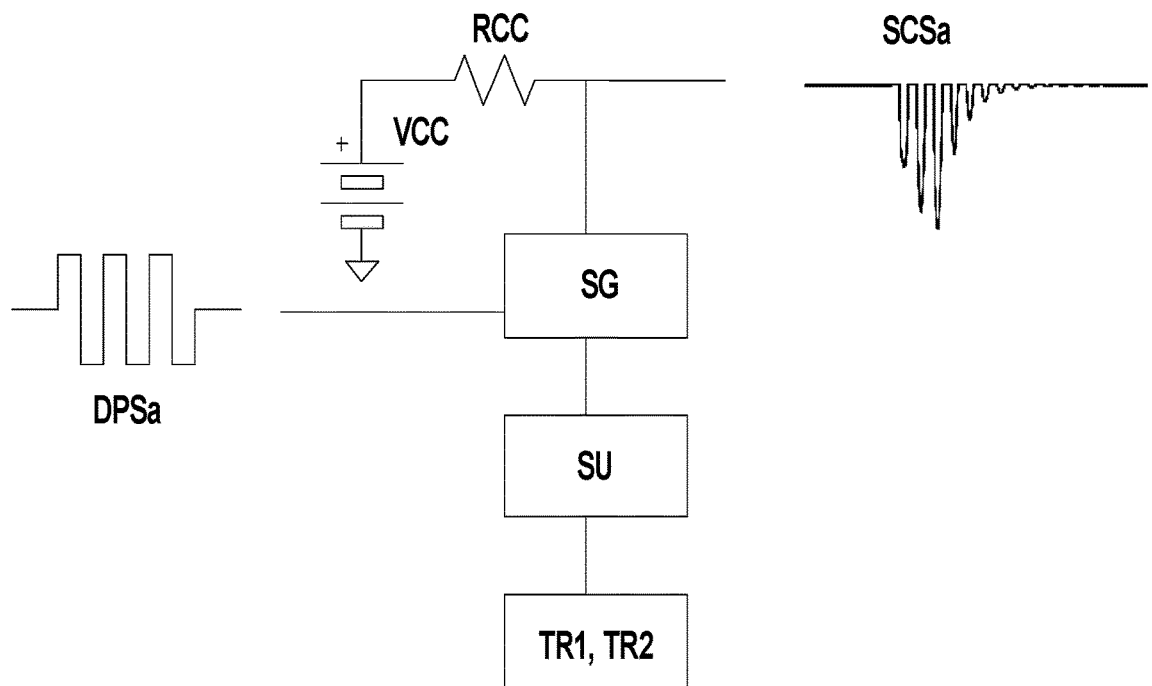
FIG. 7a illustrates schematically a set-up for performing a first step in obtaining a supply current signal of an active component driving an ultrasonic transducer.
Figure 7B:
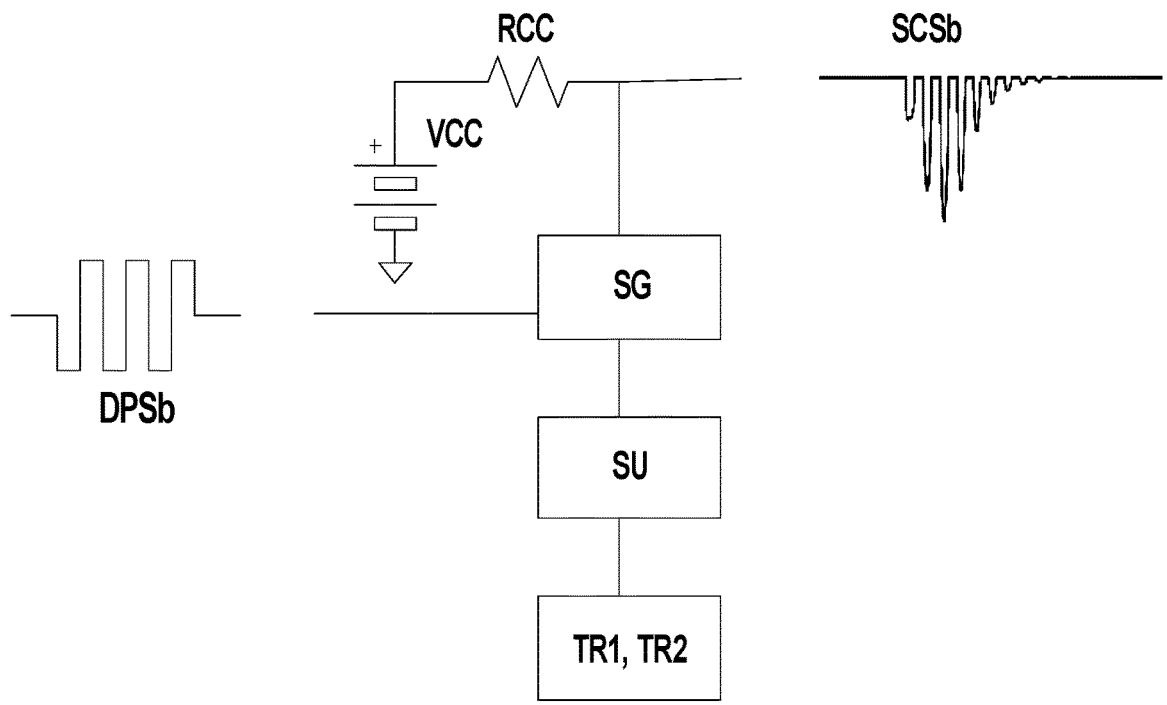
FIG. 7b illustrates schematically a set-up for performing a second step in obtaining a supply current signal of an active component driving an ultrasonic transducer.

FIGS. 7a and 7b illustrate schematically the set-up for performing a first and a second step, respectively, in obtaining supply current signal SCS−, SCS+ of an active component driving an ultrasonic transducer.

In the first step, which is illustrated in FIG. 7a, a first, short digital pulsating input signal DPSa is used as an input for a signal generator SG driving an ultrasonic transducer TR1, TR2 to which it may be connected through a switching unit SU. The signal generator SG may comprise a negative feedback coupled operational amplifier (OP; OPsg), as shown in the previous figure, or it may comprise another active component, which is able to amplify the input signal DPSa and provide an output impedance of the signal generator SG, which is very low, i.e. substantially zero. This active component might, for instance, be constituted by a digital circuit driving the transducer.

A current sensing resistor RCC (corresponding to R8 in FIG. 6) is arranged in series between the active component of the signal generator SG and the positive voltage supply VCC (corresponding to V3 in FIG. 6) for this active component. Now, by monitoring the voltage across this current sensing resistor RCC, a first supply current signal SCSa representative of the current supplied to the active component from the positive voltage supply can be obtained as illustrated on the right side of FIG. 7a.

It should be noted that when the input signal DPSa stops oscillating, the transducer will continue to be oscillating for some time, still dragging some current from the positive voltage supply through the active component. This is reflected in the first supply current signal SCSa, which comprises a higher number of oscillations than the first input signal DPSa, as is indicated in FIG. 7a, the latest part of the signal DPSa showing that the self-oscillating transducer TR1, TR2 performs a dampened oscillation.

As can also be seen from the first supply current signal SCSa illustrated in FIG. 7a, this signal is truncated in the sense that only one half part of each oscillation is comprised in the signal, the signal value being zero in the other half part of each oscillation. This is due to the fact that, if the active component of the signal generator is coupled to be a non-inverting amplifier, the positive voltage supply VCC only delivers the current to the active component when the voltage of the input signal DPSa is higher than the input common mode voltage of the active component, and if the active component is coupled to be an inverting amplifier, the positive voltage supply VCC only delivers the current to the active component when the voltage of the input signal DPSa is lower than the input common mode voltage of the active component.

Therefore, in order to obtain a second supply current signal SCSb comprising the other half part of each oscillation, the measurement is repeated with another digital pulsating input signal DPSb, which is identical to the first input signal DPSa with the one exception that the polarity of the signal has been inversed.

It should be noted that the two supply current signals SCSa, SCSb can be obtained simultaneously from the positive and the negative voltage supplies of the active component of the signal generator SG, respectively, if a similar current sensing resistor (not shown in FIGS. 7a and 7b but corresponding to R43 in FIG. 6) is arranged in series between the active component and the negative voltage supply (not shown) for the active component.

Figure 7C:
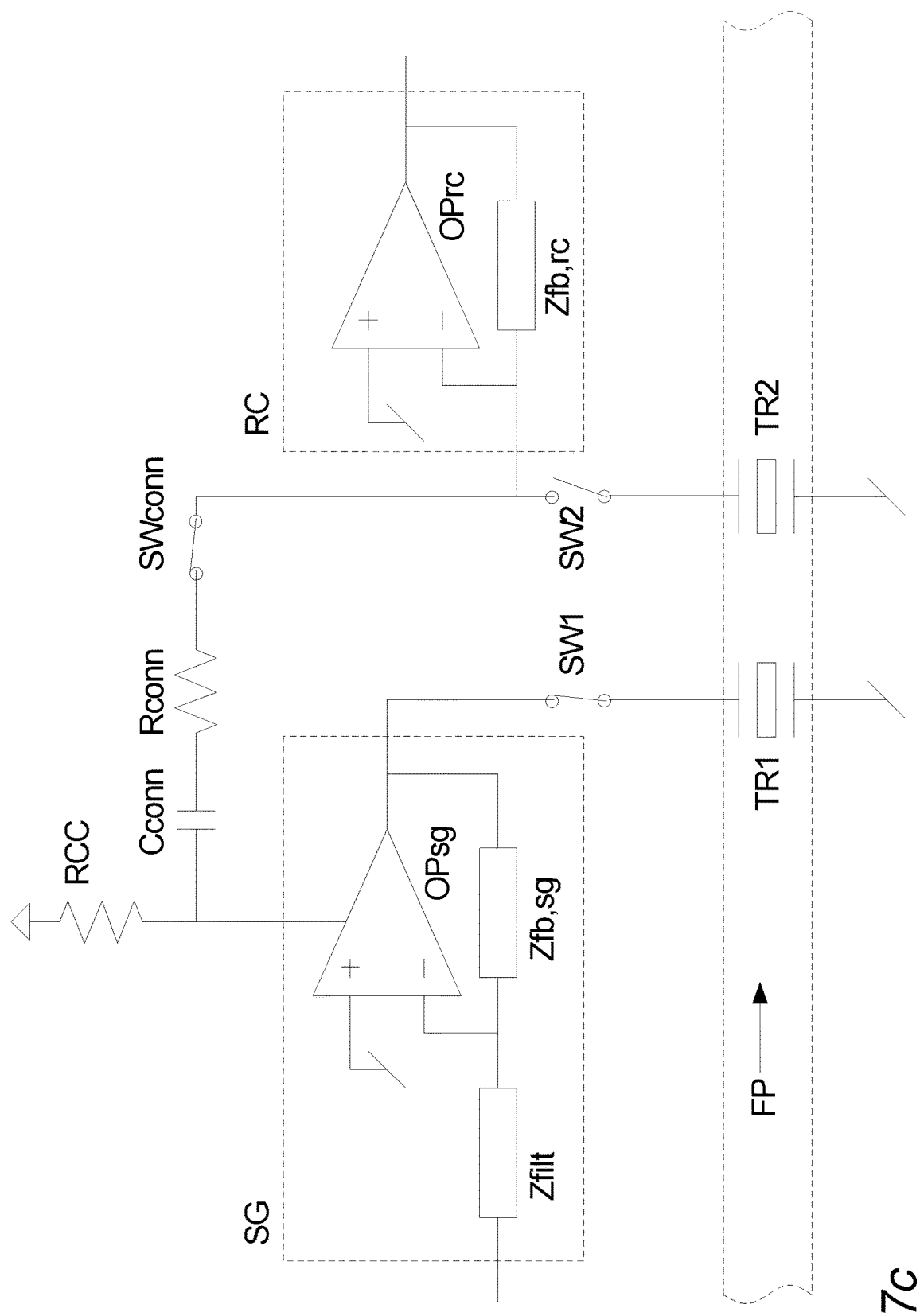
FIG. 7c illustrates an advantageous way of connecting a signal generator and a receiver circuit for obtaining such supply current signals.

FIG. 7c illustrates an advantageous way of connecting a signal generator SG and a receiver circuit RC for obtaining such supply current signals SCSa, SCSb.

In this case, the active component OPrc of the receiver circuit RC is used for amplifying the supply current signals SCSa, SCSb. The connection between the signal generator SG and the receiver circuit RC consists of a switch SWconn in series with at high pass filter consisting of a capacitor Cconn and a resistor Rconn.

As the connection SWconn, Cconn, Rconn is attached to a summation point at the inverse input terminal of the active component OPrc of the receiver circuit RC, the supply current signals SCSa, SCSb do not affect the function of the ultrasonic transducers TR1, TR2 in any way.

Furthermore, due to the transit time of the ultrasonic signal between the two transducers TR1, TR2 in the flow path FP, the supply current signals SCSa, SCSb and the signal transmitted between the transducers TR1, TR2 will reach the receiver circuit RC at different times.

At high frequencies, non-idealities of the components potentially influence the signals, and the supply current signals SCSa, SCSb may influence the signal received through the flow path FP and vice versa. A remedy for minimizing this effect is to measure the supply current signals SCSa, SCSb and the ultrasonic signal at different times and disconnect unused circuit parts from the input terminal of the active component OPrc of the receiving circuit RC by switches SW2, SWconn.

If the signal generator SG is configured as a Class A amplifier, the current drawn into the positive voltage supply pin is substantially constant, and a current sensing resistor (R43) has to be arranged in series with the negative voltage supply for a useful signal to be obtained.

Figure 8A:
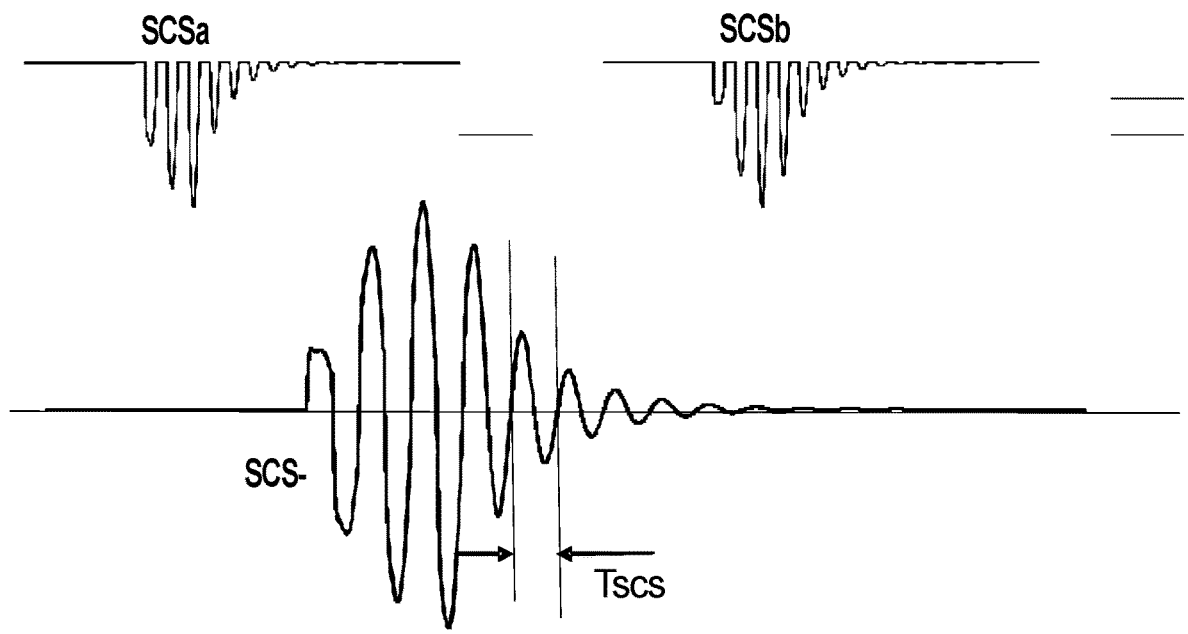
FIG. 8a illustrates schematically a first step in obtaining characteristics of an ultrasonic transducer from supply current signals of an active component driving the transducer.

By subtracting the two supply current signals SCSa, SCSb from each other as illustrated in FIG. 8a, a subtraction supply current signal SCS− is obtained, from which the oscillation period Tscs of the dampened oscillation of the transducer TR1, TR2 can easily be determined by measuring the time difference between two appropriately chosen zero crossings of the signal SCS− as is also indicated in FIG. 8a.

The relation between the oscillation period Tscs and the frequency $f_D$ and the angular frequency $\gamma_D$ of the dampened transducer oscillation is well-known:

$$Tscs = \frac{1}{f_D} = \frac{1}{2\pi\omega_D} \quad \text{(Equation 3)}$$

Figure 8B:
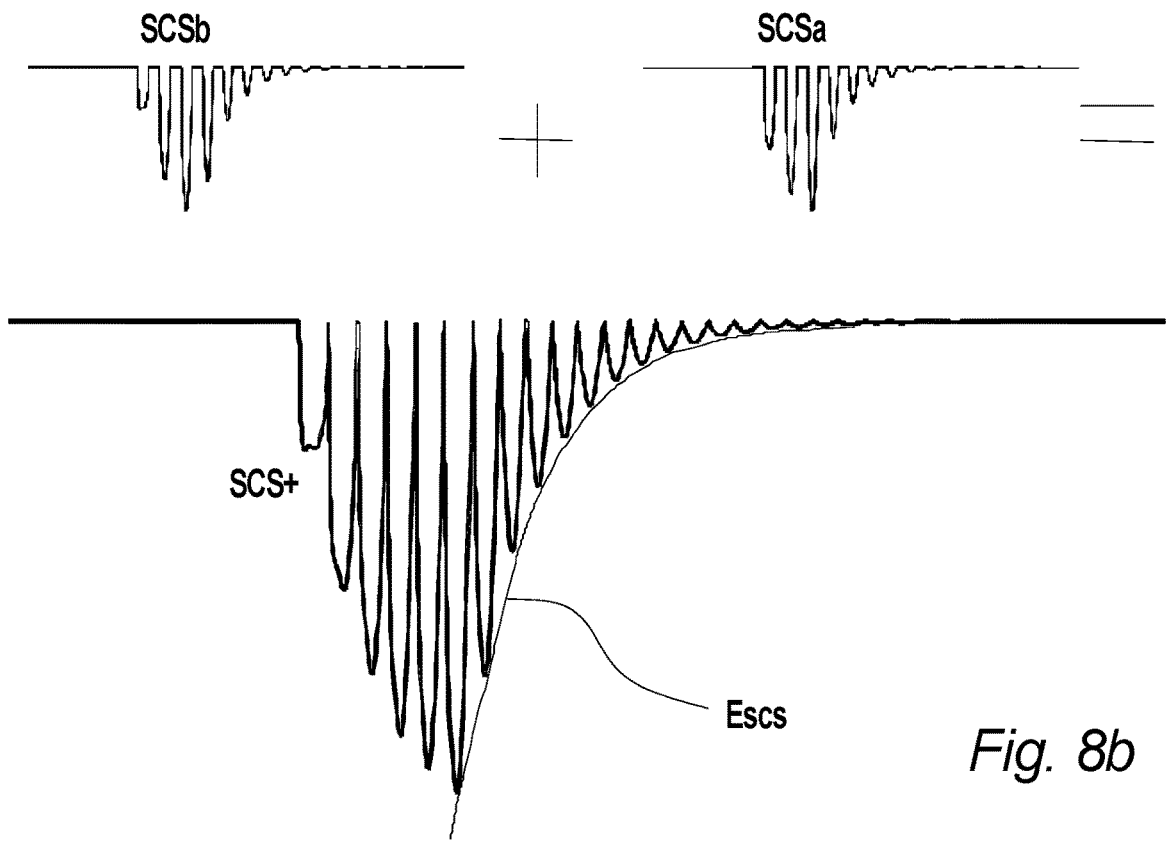
FIG. 8b illustrates schematically a second step in obtaining characteristics of an ultrasonic transducer from supply current signals of an active component driving the transducer.

Furthermore, by adding the two supply current signals SCSa, SCSb to each other as illustrated in FIG. 8b, an addition supply current signal SCS+ is obtained, the envelope Escs of the decreasing part of which can be determined. This envelope Escs has the shape of an exponential curve with respect to the time t, the mathematical formula describing the envelope being $$Escs = -ke^{-\alpha t} \quad \text{(Equation 4)}$$

where k is a constant and $\alpha$ is the damping coefficient of the dampened oscillation of the transducer TR1, TR2.

In principle, both $\Omega_D$ and $\alpha$ could be found from each of the measured supply current signals SCSa, SCSb alone. However, the two quantities can be determined with much higher accuracy using the subtraction supply current signal SCS− and the addition supply current signal SCS+ as illustrated in FIGS. 8a and 8b.

The two quantities $\omega_D$ and $\alpha$ are very useful for characterizing the transducer, being indicative of the condition of the transducer, such as, for instance, whether it might be broken or whether there might be some air around a transducer, which is supposed to be surrounded by water, etc.

Figure 9:
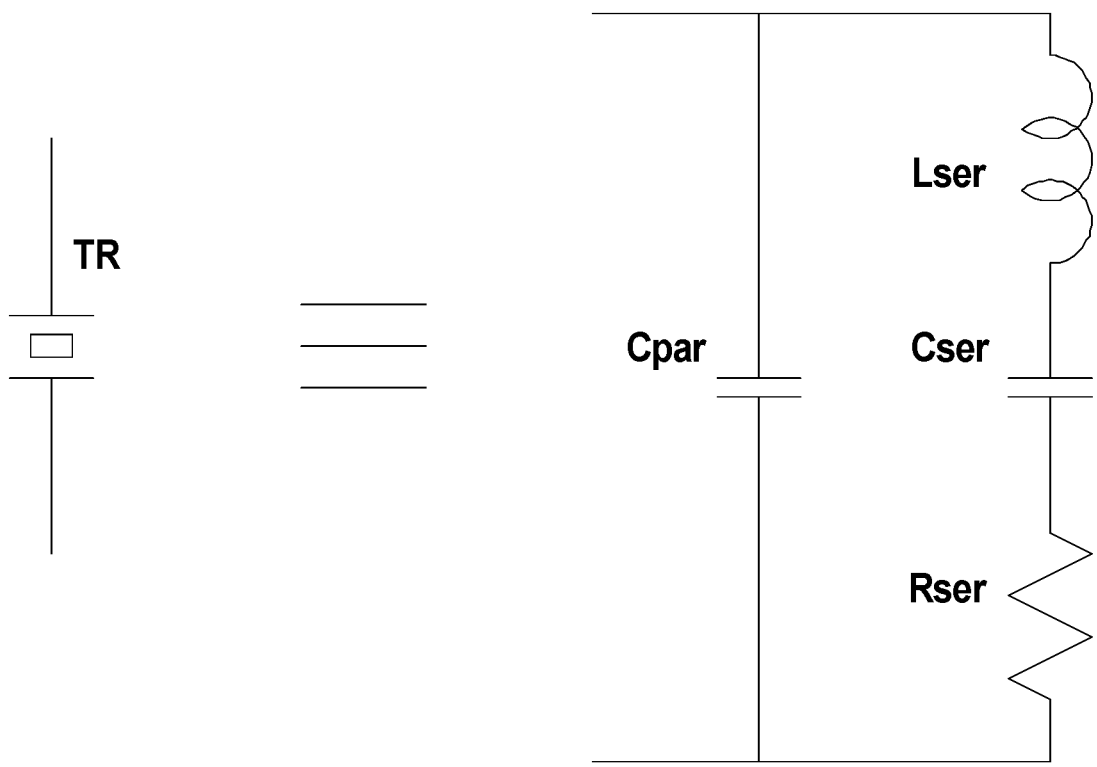
FIG. 9 illustrates a well-known equivalence diagram of an ultrasonic transducer.

FIG. 9 illustrates a well-known equivalence diagram of an ultrasonic transducer TR, comprising a parallel capacitor Cpar coupled in parallel with a series connection of a series inductor Lser, a series capacitor Cser and a series resistor Rser.

Figure 10:
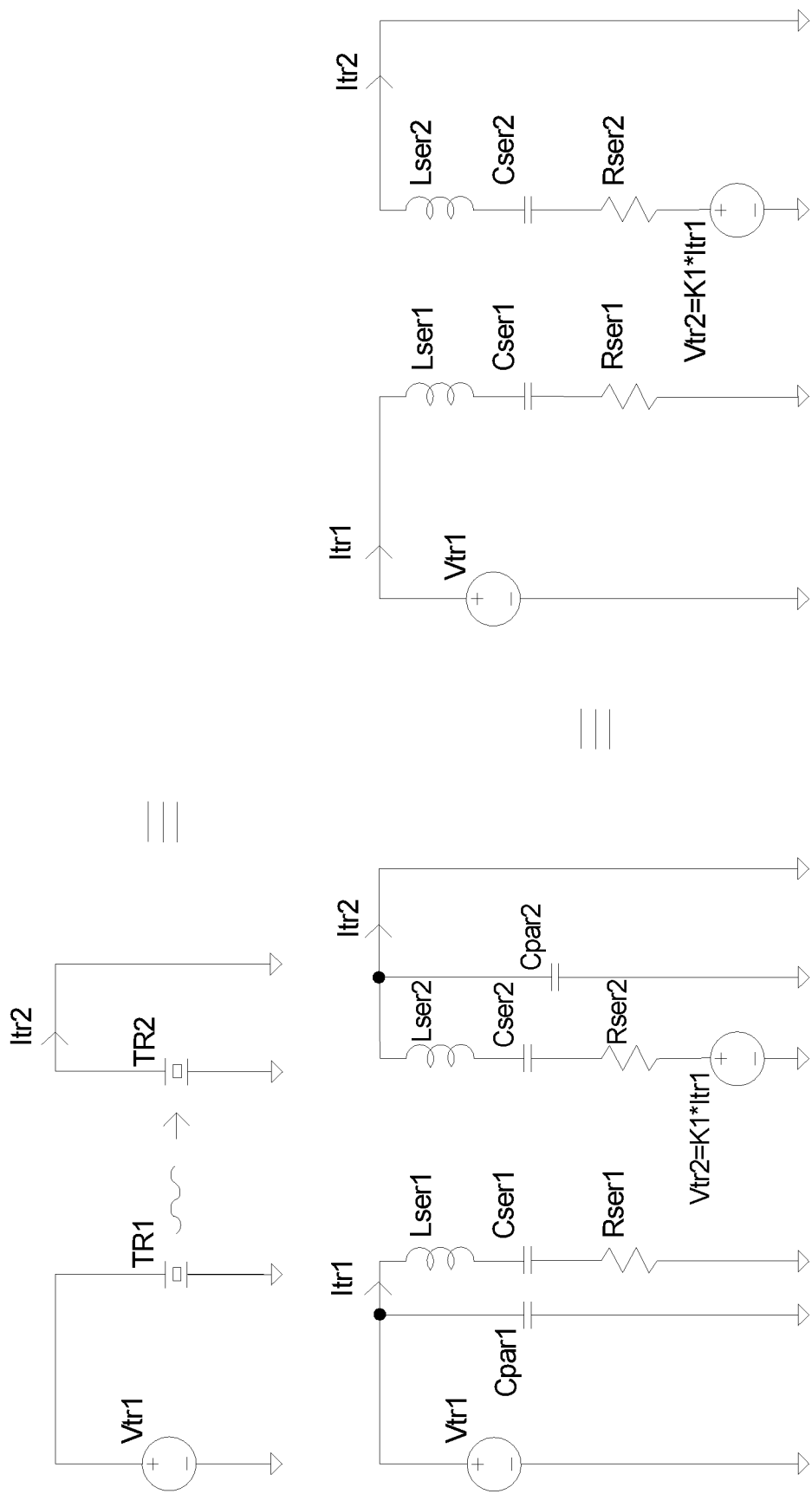
FIG. 10 illustrates some of the steps in the derivation of a simple equivalence diagram of an ultrasound flow meter according to the invention.

FIG. 10 illustrates some of the steps in the derivation of a simple equivalence diagram of an ultrasound flow meter, which can be used for simulating the signal chain through a flow meter according to the invention.

The equivalence diagram in the first part of FIG. 10 illustrates how the flow meter can be equated by a system comprising two ultrasonic transducers TR1, TR2, wherein the first transducer TR1, upon which a transmission signal in the form of a voltage signal Vtr1 is impressed, transmits an ultrasound signal to the second transducer TR2, which in turn produces a reception signal in the form of a current signal Itr2.

For a given input signal to the signal generator of the flow meter, the voltage signal Vtr1 impressed on the first transducer TR1 can be taken to be the same for each transit time measurement due to the fact that all components of the signal generator are the same for each measurement. This also means that the impressed signal Vtr1 can be calculated from the input signal using a filter model of the signal generator, once this filter model has been determined once and for all, or it can be recorded by an analogue-digital converter before the simulation procedure, which is described below.

Introducing the equivalence diagram from FIG. 9 for each of the two transducers TR1, TR2 in the equivalence diagram of the flow meter shown in the first part of FIG. 10 results in the diagram shown in the second part of FIG. 10. Here, it is noted that, due to the fact the ultrasound signal transmitted by the first transducer TR1 is proportional to the current signal Itr1 passing through the transducer TR1, the ultrasound signal reaching the second transducer TR2 can be equated by a voltage signal Vtr2 being impressed on the transducer TR2, said voltage signal Vtr2 being proportional to the current signal Itr1 as indicated in FIG. 10 by the proportionality factor K1.

The parallel capacitors Cpar1, Cpar2 have no influence on the impressed voltages Vtr1, Vtr2 across the series connections Lser1, Cser1, Rser1 and Lser2, Cser2, Rser2, respectively, in the equivalence diagram in the second part of FIG. 10 and can, thus, be ignored. Therefore, the resulting equivalence diagram of the flow meter to be used for simulating the signal chain through the flow meter is the one shown in the third and final part of FIG. 10.

The relations between the impressed voltage signals Vtr1, Vtr2 and the resulting current signals Itr1, Itr2 can be found by well-known differential equations:

$$Itr1 = \frac{Vtr1}{sLser1 + \frac{1}{sCser1} + Rser1} \quad \text{(Equation 5)}$$

$$= \frac{1}{Lser1} \frac{s}{s^2 + s\frac{Rser1}{Lser1} + \frac{1}{Lser1 Cser1}} Vtr1$$

$$Itr2 = \frac{Vtr2}{sLser2 + \frac{1}{sCser2} + Rser2} \quad \text{(Equation 6)}$$

$$= \frac{K1 Itr1}{sLser2 + \frac{1}{sCser2} + Rser2}$$

$$= \frac{K1}{Lser1 Lser2} \frac{s}{s^2 + s\frac{Rser1}{Lser1} + \frac{1}{Lser1 Cser1}}$$

$$\frac{s}{s^2 + s\frac{Rser2}{Lser2} + \frac{1}{Lser2 Cser2}} Vtr1$$

$$= K2 \frac{s}{s^2 + 2\alpha_1 s + \omega_1^2} \frac{s}{s^2 + 2\alpha_2 s + \omega_2^2} Vtr1$$

$\alpha_1$ and $\alpha_2$ are the damping coefficients relating to the first ultrasonic transducer TR1 and the second ultrasonic transducer TR2, respectively, corresponding to the damping coefficients that can be found from the envelope of the addition supply current signals SCS+, as described above.

$\omega_1$ and $\omega_2$ are the undampened angular oscillation frequencies of the first ultrasonic transducer TR1 and the second TR2 ultrasonic transducer, respectively. The relation between these undampened angular oscillation frequencies $\omega_1$, $\omega_2$ used in the simulation equations and the corresponding dampened angular oscillation frequencies $\omega_{D1}$ and $\omega_{D2}$ found by measuring the time difference between two appropriately chosen zero crossings of the dampened oscillation in the subtraction supply current signals SCS−, as described above, is as follows:

$$\omega_1 = \sqrt{\omega_{D1}^2 + \alpha_1^2} \wedge \omega_2 = \sqrt{\omega_{D2}^2 + \alpha_2^2} \quad \text{(Equation 7)}$$

K2 is a proportionality factor, which can be calculated. However, like the specific component values of Cser1, Lser1, Rser1, Cser2, Lser2, Rser2 of the equivalence diagram in the last part of FIG. 10, the value of K2 is not needed for using Equation 6 for simulating the signal chain through the flow meter.

The last expression of Equation 6, which is a differential equation for a circuit comprising two second order oscillating circuits, can be simulated by means of well-known mathematical tools, such as for instance the Runge-Kutta method.

Figure 11:
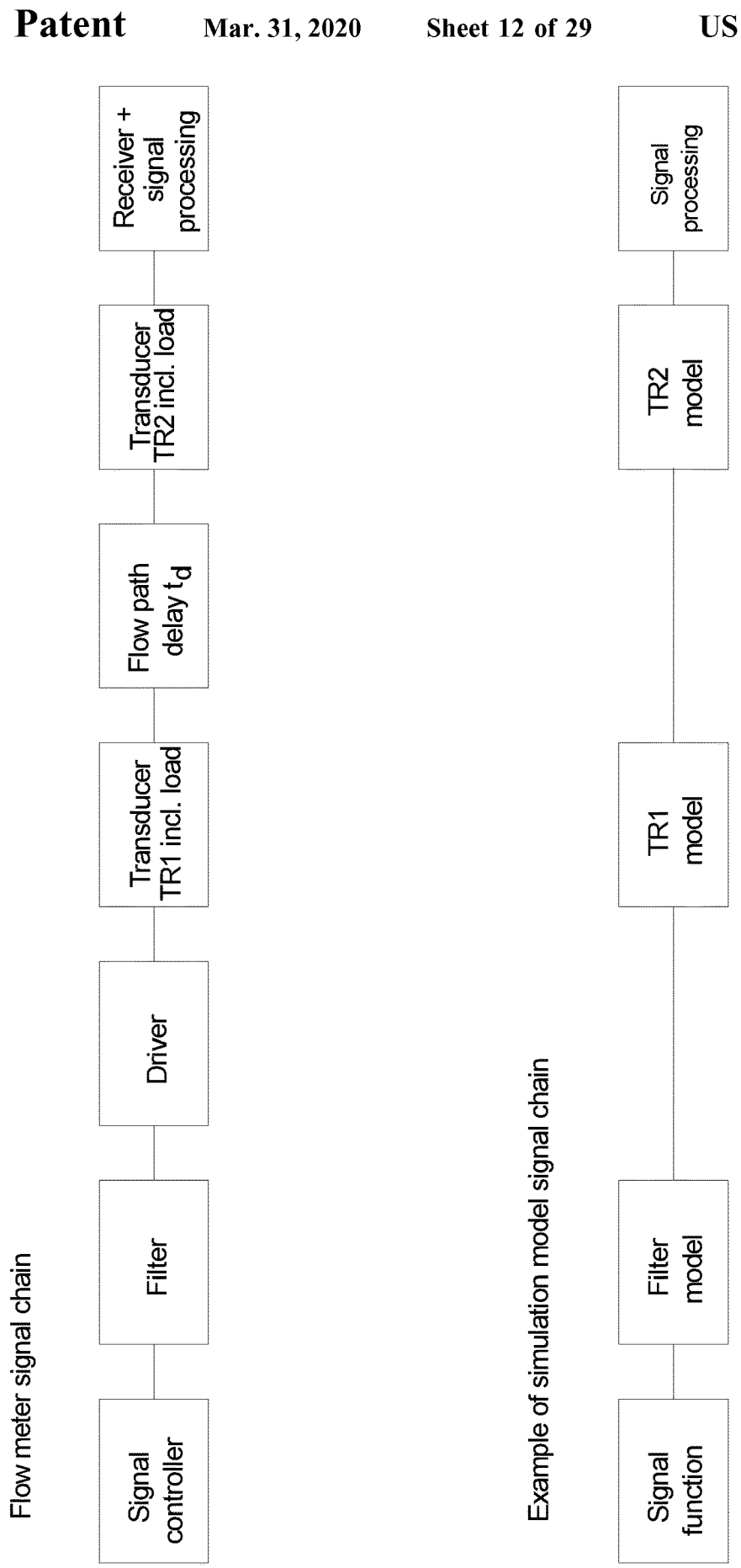
FIG. 11 illustrates the differences and similarities between a physical and a simulated signal chain through a flow meter according to the invention.

FIG. 11 illustrates some of the differences and similarities between a physical and a simulated signal chain through a flow meter according to the invention.

In the simulated signal chain, the physical transducers TR1, TR2 and the loads related to them are modelled, for instance as already described above.

In the fully simulated signal chain in FIG. 11, the output from the physical signal generator, which filters a digital input signal from a signal controller and works as a driver for the first transducer TR1 by amplifying the filtered input signal, is simulated by a signal function being filtered using a filter model of the signal generator before being used as input function for the simulated transducer model. In another embodiment of the simulated signal chain, the input function for the simulated transducer model may be produced by recording the actual output from the a physical signal generator by an analogue-digital converter, thus obtaining a signal chain that is partly physical, partly a simulated model.

The reception of the electrical reception signal by the receiver circuit and the subsequent signal processing in the physical signal chain is replaced by signal processing alone in the simulated signal chain, this signal processing optionally including a model (not shown) of the receiver circuit.

Thus, if the signal function in the simulated signal chain does, in fact, correspond to the input signal from the signal controller in the physical signal chain, and if the filter models of the signal generator and (optionally) the receiver circuit and the transducer models are adequate, the only difference between the output of the final signal processing of the simulated signal chain and the output of the final signal processing of the physical signal chain will be the time delay $t_d$ of the ultrasonic signal in the flow path FP, which is not a part of the simulated signal chain.

Figure 12:
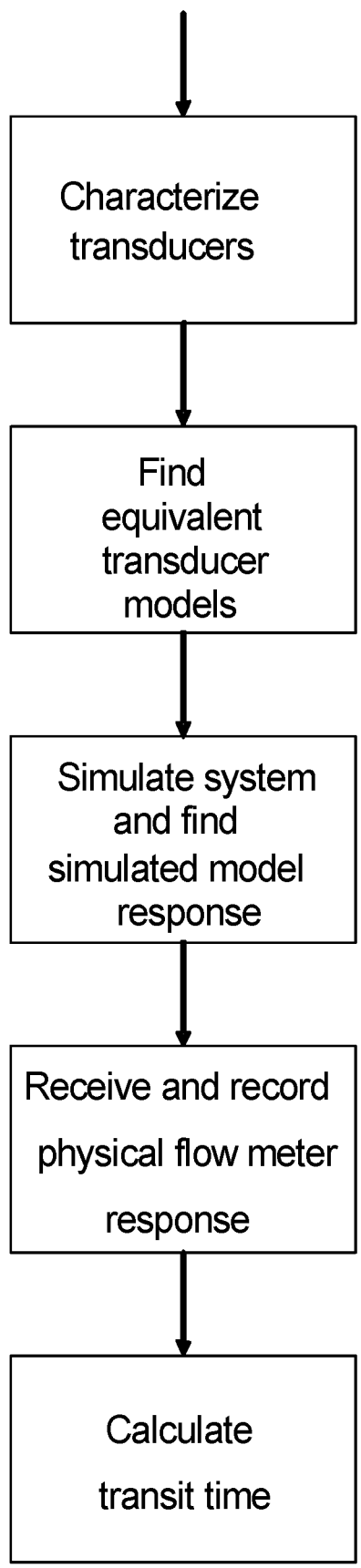
FIG. 12 illustrates schematically a method according to the invention for determining very precisely the time delay of the ultrasonic signal in the flow path.

The simulated model response being substantially identical to the physical flow meter response except for the time delay $t_d$ of the ultrasonic signal in the flow path FP and a possible amplification factor makes it possible to determine this time delay $t_d$ very precisely by following a method like the one illustrated schematically in FIG. 12.

The first step in this method is to characterize the two transducers TR1, TR2 by determining characteristic quantities, such as the angular frequency $\omega_D$ and the damping coefficient α of dampened oscillations of the transducers TR1, TR2 as described above.

Secondly, by using the known angular oscillation frequency ω of the transmission signal used in the flow meter, an equivalence model of the transducers TR1, TR2 can be found using Equations 5-7, and a numerical simulation model of the transducers TR1, TR2 and the electronic circuits of the signal generator SG and the receiver circuit RC can be established.

Thirdly, the system can be simulated by entering the input signal function (or alternatively a sampled version of the physical transmission signal reaching the first transducer) into the numerical simulation model, whereby the simulation model response, i.e. the output signal from the receiver circuit RC as it would be according to the model, if there was no time delay in the transmission of the ultrasonic signal between the two transducers TR1, TR2, can be found.

In the fourth step of the method, the physical flow meter response, i.e. the physical reception signal actually received by the receiver circuit RC, is recorded.

Finally, the absolute transit time can be calculated by determining the time delay of the physical flow meter response as compared to the simulation model response.

Figure 13:
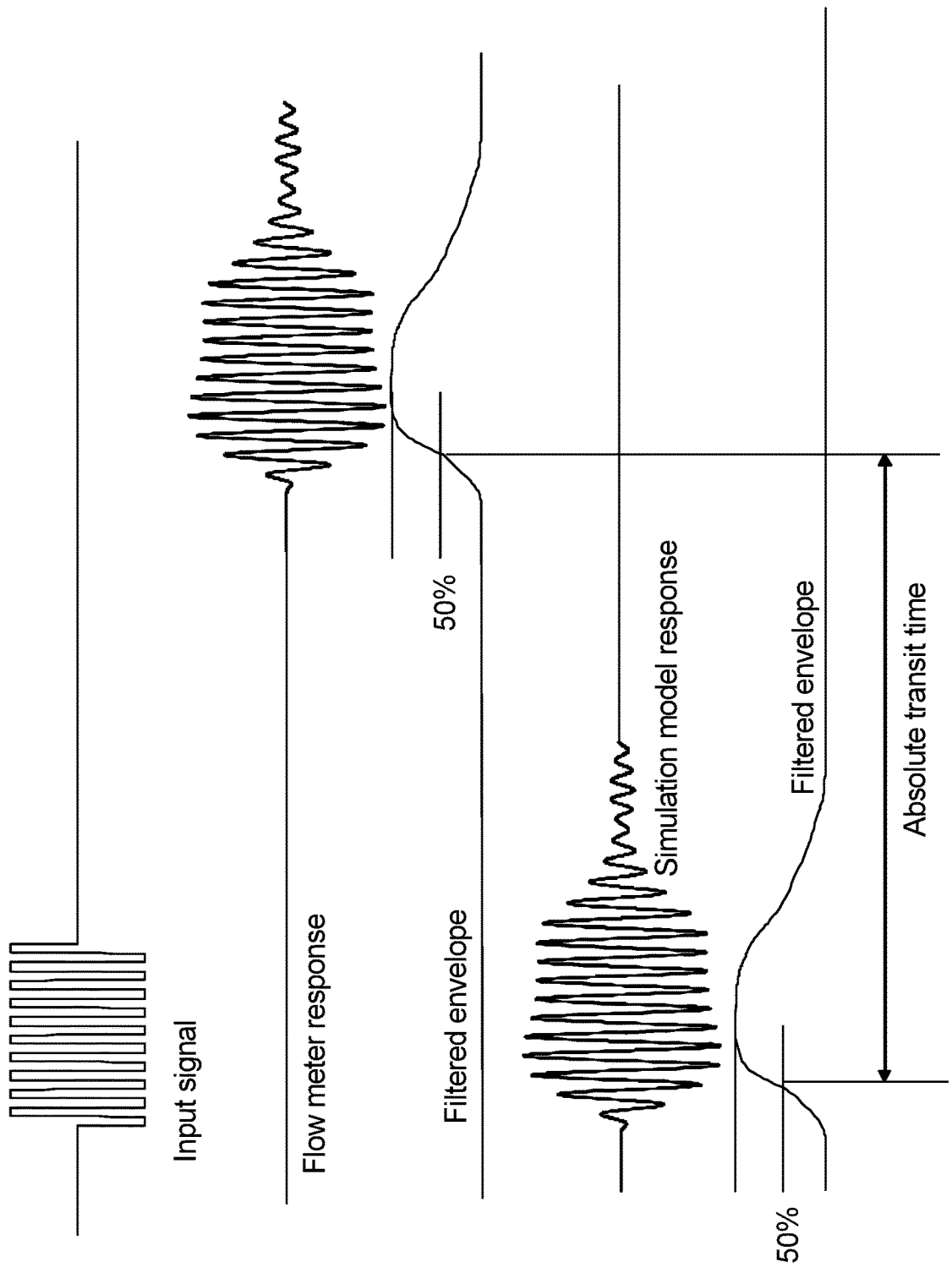
FIG. 13 illustrates schematically in more detail a method for calculation of the absolute transit time from response signals obtained by a method as the one illustrated in FIG. 12.

FIG. 13 illustrates one example of how such a calculation of the absolute transit time may be performed according to the invention.

Following the above-described method, an input signal entered to the system results in a measured physical flow meter response with a certain delay and in a simulation model response with substantially no delay. As mentioned above, if the equivalence model of the transducers TR1, TR2 is adequate, the two response signals will be substantially identical except for the time delay, which is illustrated in FIG. 13.

Now, the absolute transit time, i.e. the time delay between the two signals, can be determined very precisely, for instance by finding a filtered envelope of each of the two signals and determining the time difference between the two points, in which the filtered envelopes have reached 50% of their maximum value, respectively. This approach for finding the absolute transit time is illustrated schematically in FIG. 13.

Figure 14:
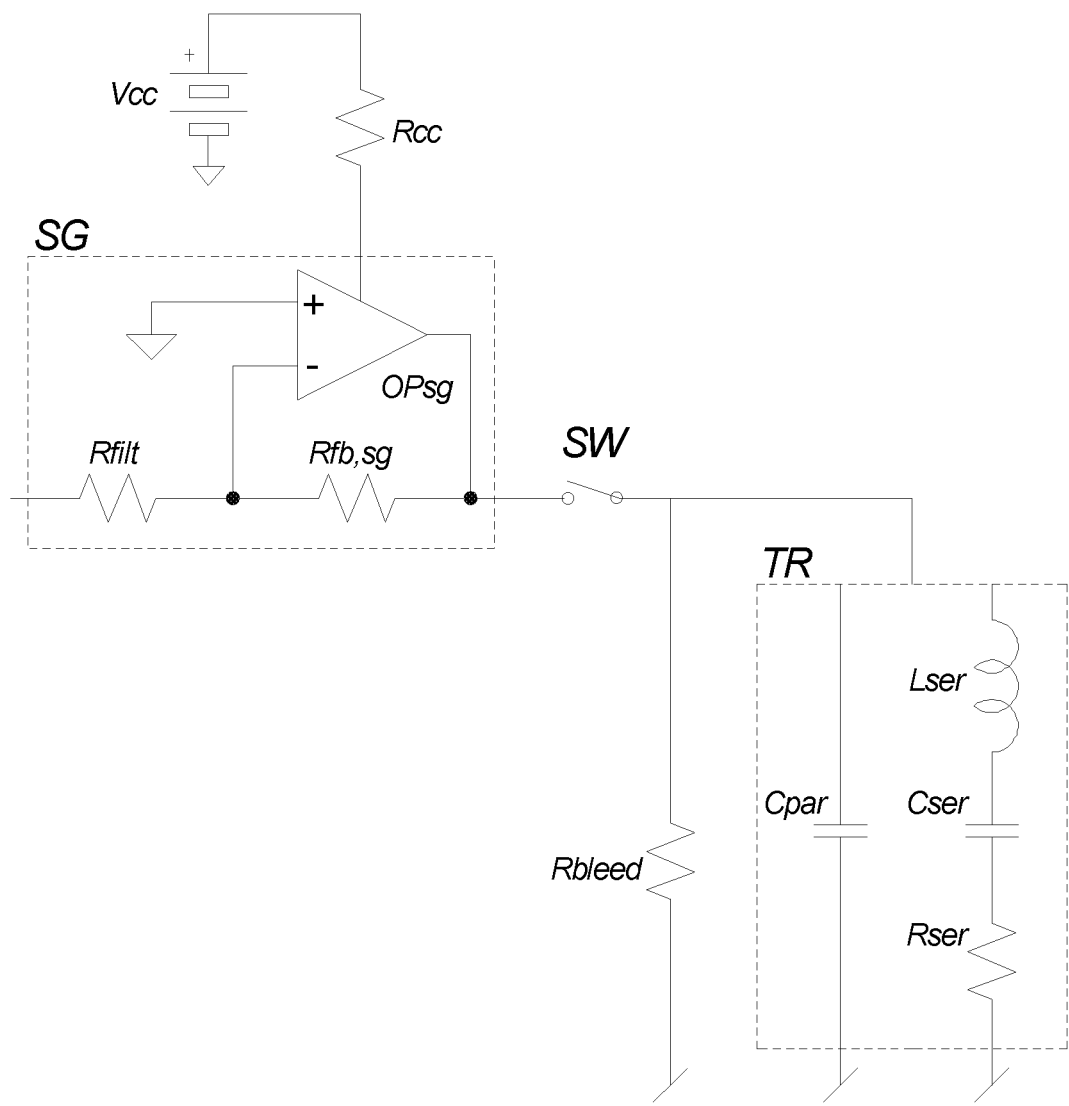
FIG. 14 illustrates an equivalence diagram of a signal generator and an ultrasonic transducer connected thereto according to the invention.

FIG. 14 illustrates an equivalence diagram of a signal generator SG and an ultrasonic transducer TR connected thereto. Basically, the signal generator SG in FIG. 14 is of the type shown in FIG. 5 with a feedback resistance Rfb,sg and a filter resistance Rfilt, and the ultrasonic transducer TR is represented by the equivalence diagram illustrated in FIG. 9.

The active component OPsg of the signal generator SG is equipped with a current sensing resistor RCC arranged in series with the positive voltage supply VCC as described above. The ultrasound transducer TR is connected to the signal generator SG through a switch SW and bypassed by a bleeder resistor Rbleed corresponding to R13 and R14 in FIG. 6.

With the diagram in FIG. 14 as the point of departure, another method for determining the absolute transit time can be described, which is as precise as the method described above but even more efficient in the terms of calculations needed, and which characterizes the impulse response of the transducer system rather than characterizing the transducers TR1, TR2 themselves as described above.

In this alternative method, a single pulse supply current signal SPSCS1, SPSCS2 is recorded for each of the ultrasonic transducers TR1, TR2 by connecting the respective transducer TR1, TR2 to the output of the signal generator SG and obtaining a signal corresponding to the subtraction supply current signal SCS− as described above for the other method.

Figure 15A:
FIG. 15a illustrates a single pulse signal.
Figure 15B:
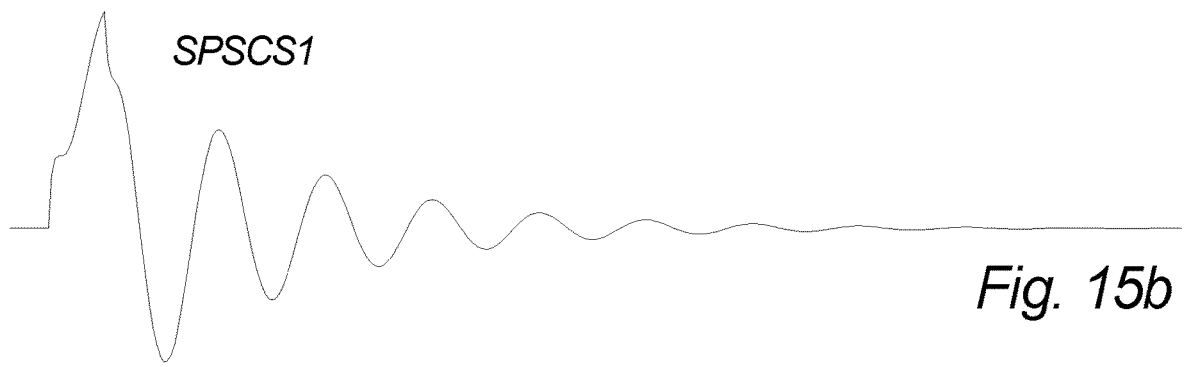
FIG. 15b illustrates a supply current signal for a first ultrasound transducer obtained in response to the single pulse in FIG. 15a, FIG. 15c illustrates a supply current signal for a second ultrasound transducer obtained in response to the single pulse in FIG. 15a, FIG. 15d illustrates a supply current signal obtained without any ultrasound transducers in response to the single pulse in FIG. 15a, FIG. 16a illustrates a calculated single pulse response of a first ultrasound transducers.
Figure 15C:
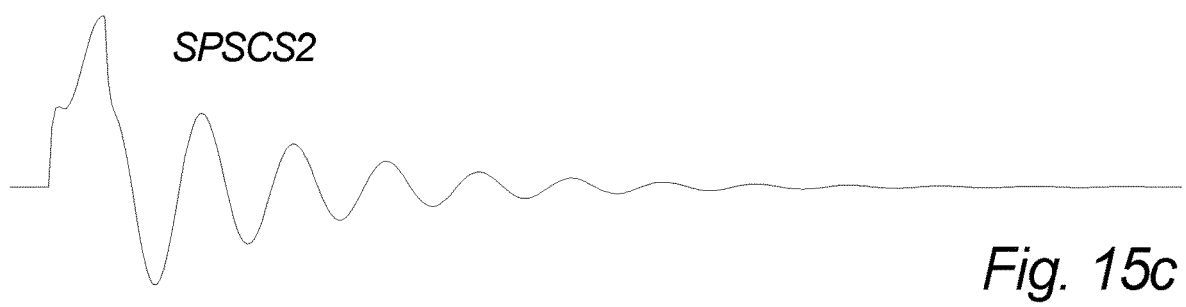

The difference from the previous method is that in this case, the digital pulsating input signals DPSa, DPSb have been replaced by a single pulse like the one illustrated in FIG. 15a, which result in single pulse supply current signals SPSCS1, SPSCS2 for the two transducers TR1, TR2, respectively, like illustrated in FIGS. 15b and 15c.

It is obvious that the first oscillation of each of the two single pulse supply current signals SPSCS1, SPSCS2 are somewhat distorted. This is due to the fact that not all of the current supplied by the active component OPsg of the signal generator SG passes through the oscillation circuits Lser, Cser, Rser of the equivalent of the ultrasonic transducers TR1, TR2, respectively. In order to find the single pulse responses SPRTR1, SPRTR2 of these oscillating circuits, the currents through the two resistances Rfb,sg and Rfilt and the capacitance Cpar must be removed from the single pulse supply current signals SPSCS1, SPSCS2.

Figure 15D:

The current through Rfb,sg, which is connected to virtual ground, can easily be found by opening the switch SW shown in FIG. 14 and repeating the measurements without any ultrasound transducers TR1, TR2 connected to the signal generator. This results in a single pulse supply current signal SPSCS0 as the one illustrated in FIG. 15d, which is proportional to the single pulse SP in FIG. 15a due to the fact that Rfb,sg is an ohmic resistance.

The current through Rfilt cannot be measured as easy as the current through Rfb,sg. However, since Rfilt is an ohmic resistance connected to ground in parallel to Rfb,sg, the current through Rfilt can easily be calculated from SPSCS0, when the ratio between Rfb,sg and Rfilt is known, and the two current signals can be subtracted from each of the two single pulse supply current signals SPSCS1, SPSCS2 for the two ultrasonic transducers TR1, TR2.

As for the current through Cpar, it consists of a transient spike coinciding with the leading edge of the single pulse SP and another transient spike of opposite polarity coinciding with the trailing edge of the single pulse SP. These spikes are of so short duration compared to the oscillation periods of the single pulse supply current signals SPSCS1, SPSCS2 for the two ultrasound transducers TR1, TR2, that they can easily be subtracted from each of the single pulse supply current signals SPSCS1, SPSCS2 by simple interpolation.

Figure 16A:
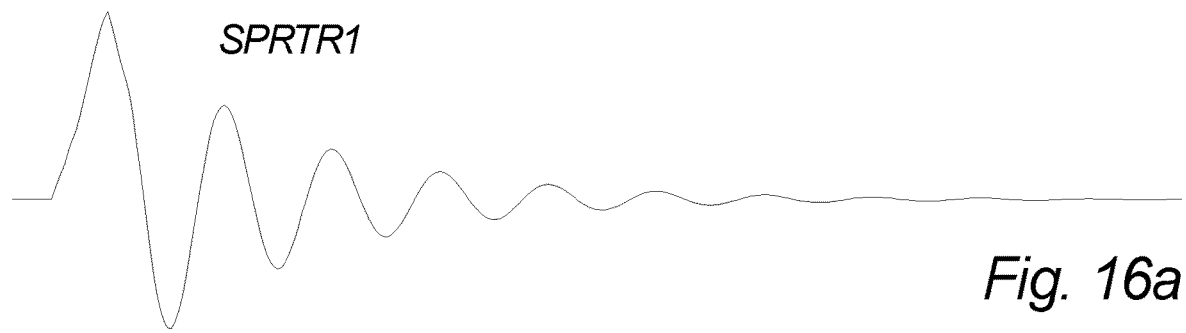
FIG. 16b illustrates a calculated single pulse response of a second ultrasound transducers.
FIG. 16c illustrates a calculated single pulse response of a complete ultrasound transducer system according to the invention.
Figure 16B:
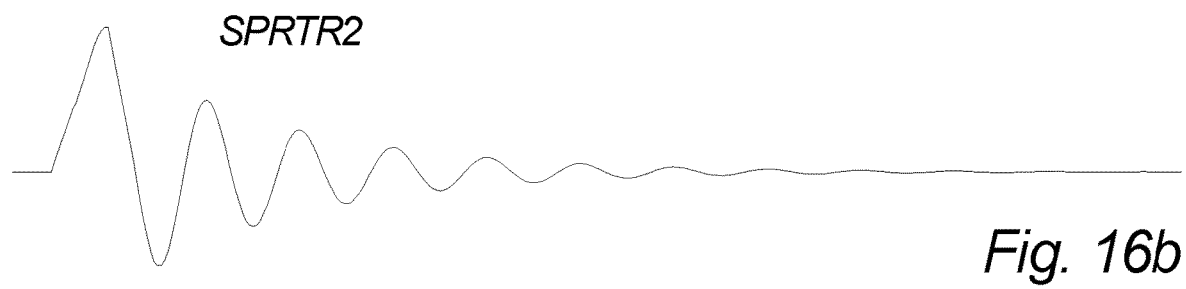

After subtracting the currents through Rfb,sg, Rfilt and Cpar from each of the two single pulse supply currents signals SPSCS1, SPSCS2 for the two ultrasound transducers TR1, TR2 as described above, the calculated single pulse responses SPRTR1, SPRTR2 of the two ultrasound transducers TR1, TR2, respectively, which may look like illustrated in FIGS. 16a and 16b, respectively, have been obtained.

Figure 16C:
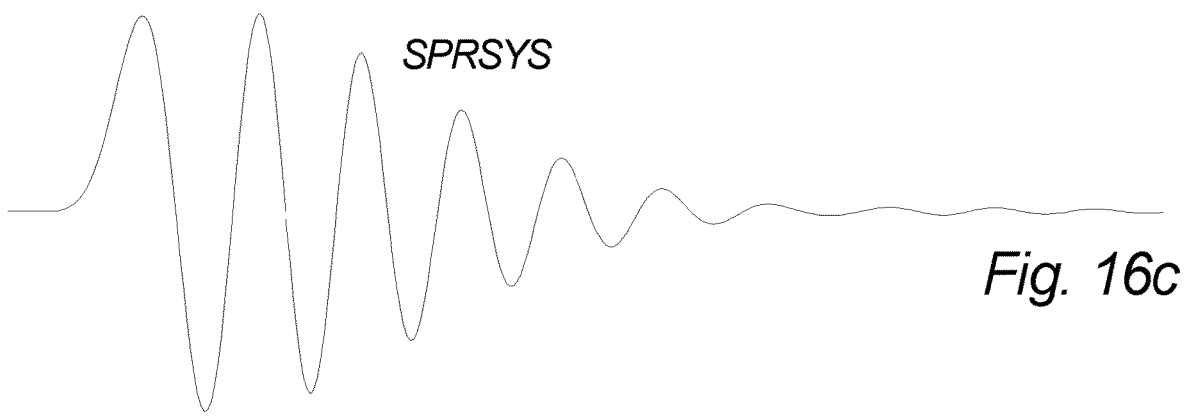

The calculated single pulse response SPRSYS for the complete ultrasound transducer system, which is illustrated in FIG. 16c, is found as a convolution of the single pulse responses SPRTR1, SPRTR2 of the two ultrasound transducers TR1, TR2 and may look like illustrated in FIG. 16c.

Figure 17A:
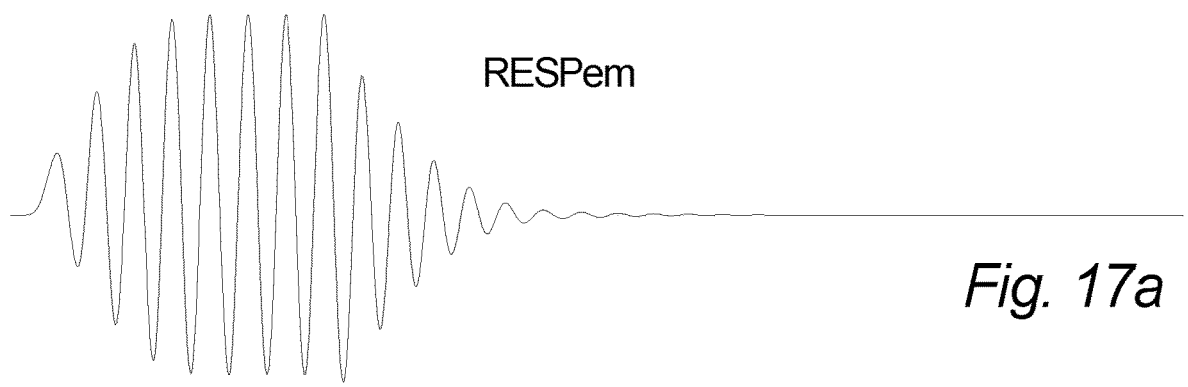
FIG. 17a illustrates an emulated flow meter response.
Figure 17B:
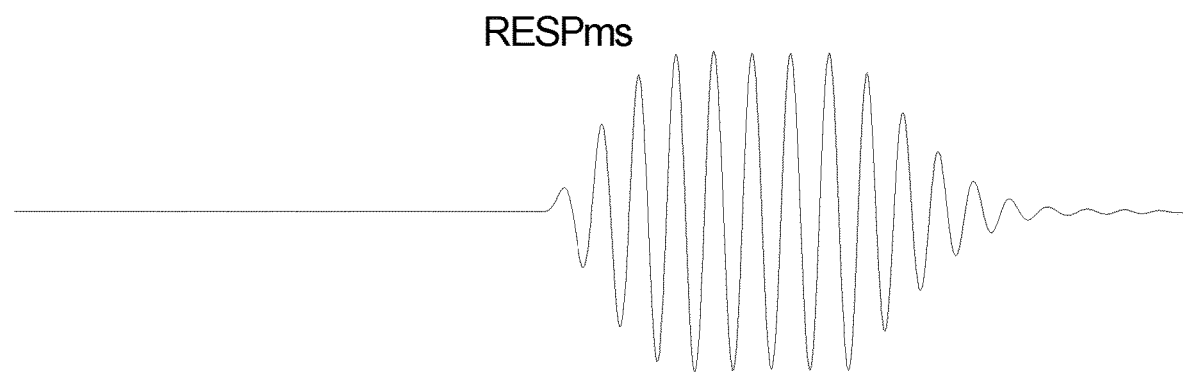
FIG. 17b illustrates a measured flow meter response.

By repeating the calculated single pulse response SPRSYS a number of times with a suitable delay, an emulated flow meter response corresponding to an input signal comprising a number of pulses can be calculated, which is very similar to the actually measured flow meter response except for the time delay of the latter due to the transit time between the two ultrasound transducers TR1, TR2. FIGS. 17a and 17*b* illustrate an emulated flow meter response RESPem and a corresponding measured flow meter response RESPms, respectively.

The absolute transit times may be determined by comparing filtered envelopes of the emulated flow meter response and the measures flow meter response, respectively, as illustrated schematically in FIG. 13 and described above, or they may be determined by using Fast Fourier Transformation (FFT) as described here below.

In the time domain, the estimated flow meter response z'(t) can be calculated from the equation:

$$z'(t)=y_1(t)*y_2(t)*x(t) \quad \text{(Equation 8)}$$

where $y_1(t)$ and $y_2(t)$ are the calculated single pulse responses of the two ultrasonic transducers TR1, TR2, respectively, represented by the two signals SPSCS1 and SPSCS2 in FIGS. 16*a* and 16*b*, respectively, and x(t) is the input signal on the input terminal of the active component OPsg of the signal generator SG.

It should be noted that in Equation 8 above, the symbol '*' is used as an operator indicating a convolution of the signals surrounding it, which is not to be confused with the multiplication operation often indicated by the same symbol.

In the time domain, the relation between the estimated flow meter response z'(t) and the measured flow meter response z(t) is given by $$z(t) \approx z'(t-t_d) \quad \text{(Equation 9)}$$

where $t_d$ is the time delay of the ultrasonic signal in the flow path FP.

This reflects that the measured flow meter response and the estimated flow meter response are close to being identical with exception of the time delay $t_d$ of the former.

Figure 18A:
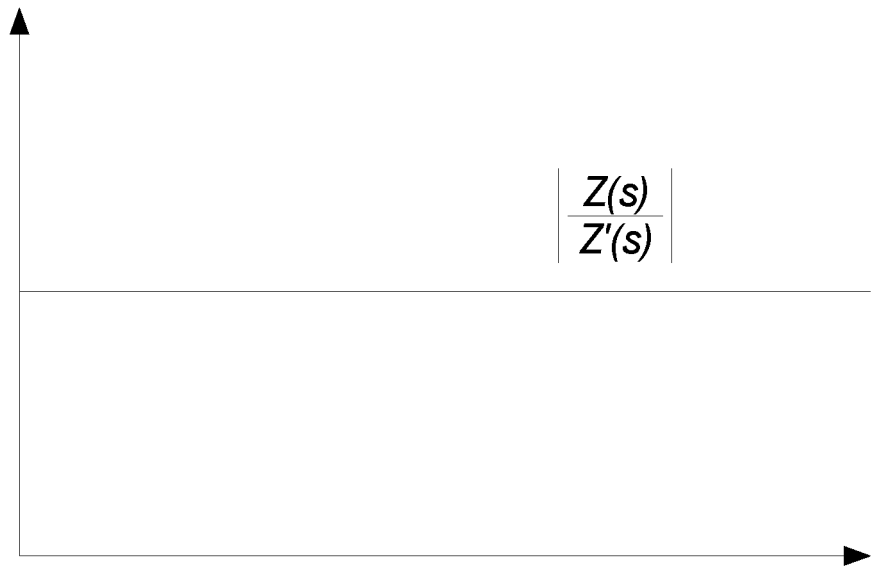
FIG. 18a illustrates the theoretical relation between the magnitudes of the real and the emulated flow meter responses in the frequency domain.

If the estimated response had been perfect this would mean that, in the frequency domain, the magnitudes of the measured flow meter response Z(s) and of the estimated flow meter response Z'(s) would be the same for all frequencies as shown in FIG. 18*a*.

Figure 18B:
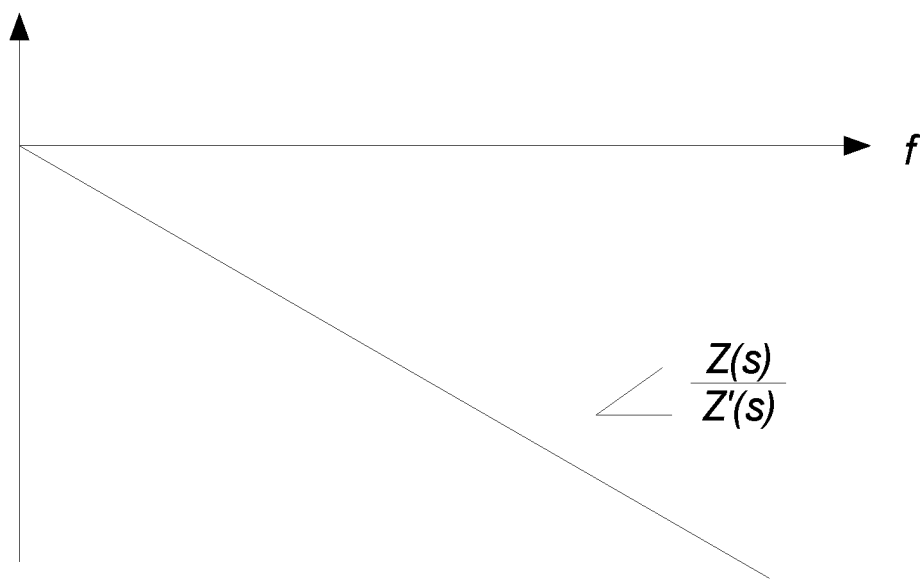
FIG. 18b illustrates the theoretical phase angles between the real and the emulated flow meter responses in the frequency domain.

Furthermore, the phase angle between Z(s) and Z'(s) would change linearly with the frequency as indicated in FIG. 18*b*, the slope of the line in FIG. 18*b* being the group time delay, corresponding to the time delay $t_d$ of the ultrasonic signal in the flow path FP.

Figure 19:
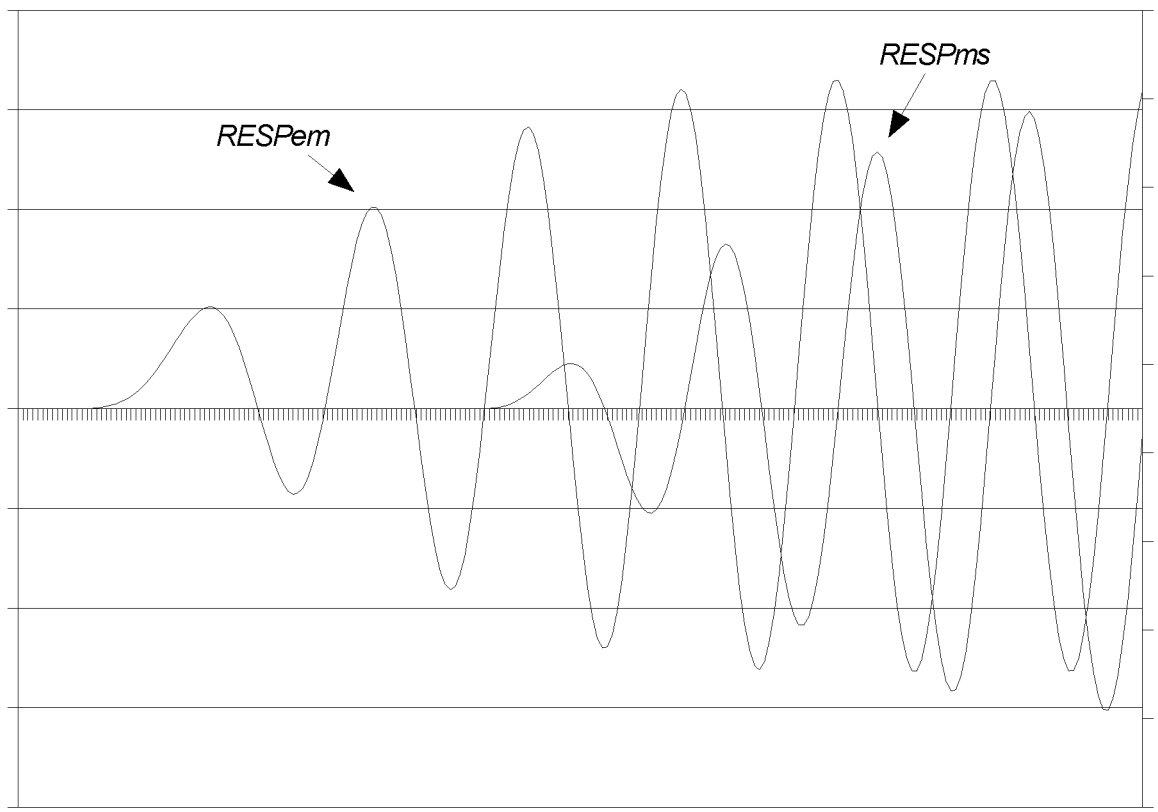
FIG. 19 illustrates an example of corresponding emulated and measured flow meter responses.

FIG. 19 shows an actual flow meter response RESPem estimated as described above and the corresponding actually measured flow meter response RESPms depicted in the same graph for displaying the similarity of the two signals and the time delay there between.

Figure 20A:
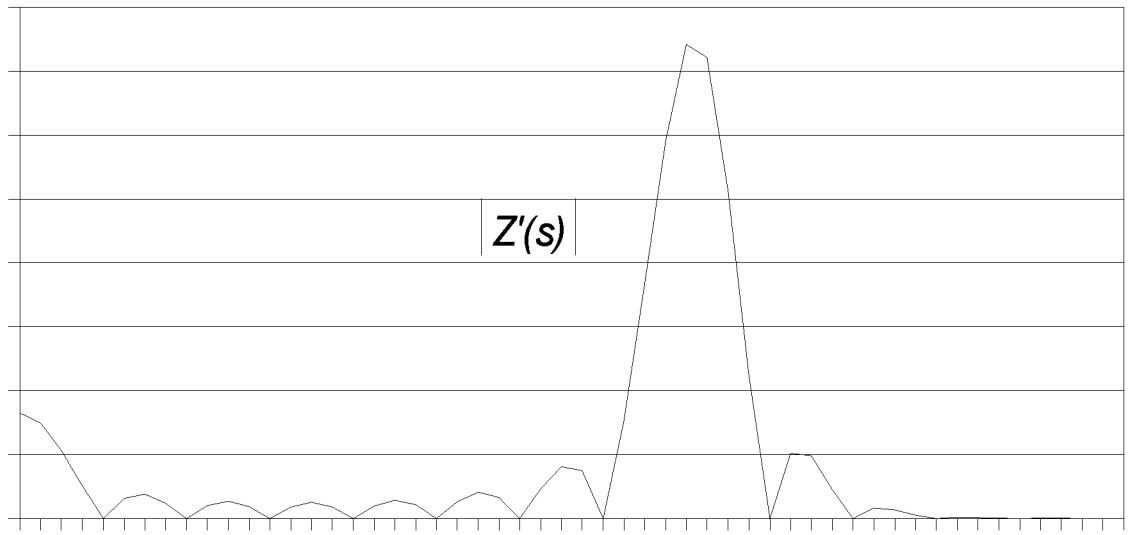
FIG. 20a illustrates the magnitude in the frequency domain of the emulated flow meter response shown in FIG. 19.
Figure 20B:
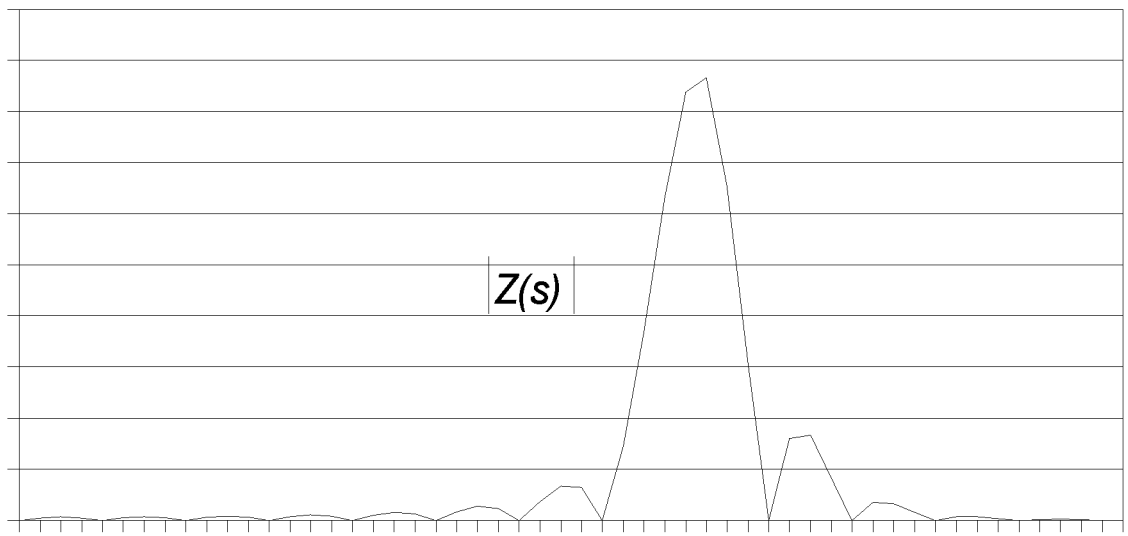
FIG. 20b illustrates the magnitude in the frequency domain of the measured flow meter response shown in FIG. 19.

The magnitudes |Z'(s)| and |Z(s)| of the two flow meter responses in the frequency domain, corresponding to RESPem and RESPms, respectively, are shown in FIGS. 20*a* and 20*b*, respectively. Although similar, it is clear that the two graphs are not completely identical, indicating that the estimated flow meter response RESPem deviates slightly from the measured flow meter response RESPms even if the time delay is ignored.

Figure 21A:
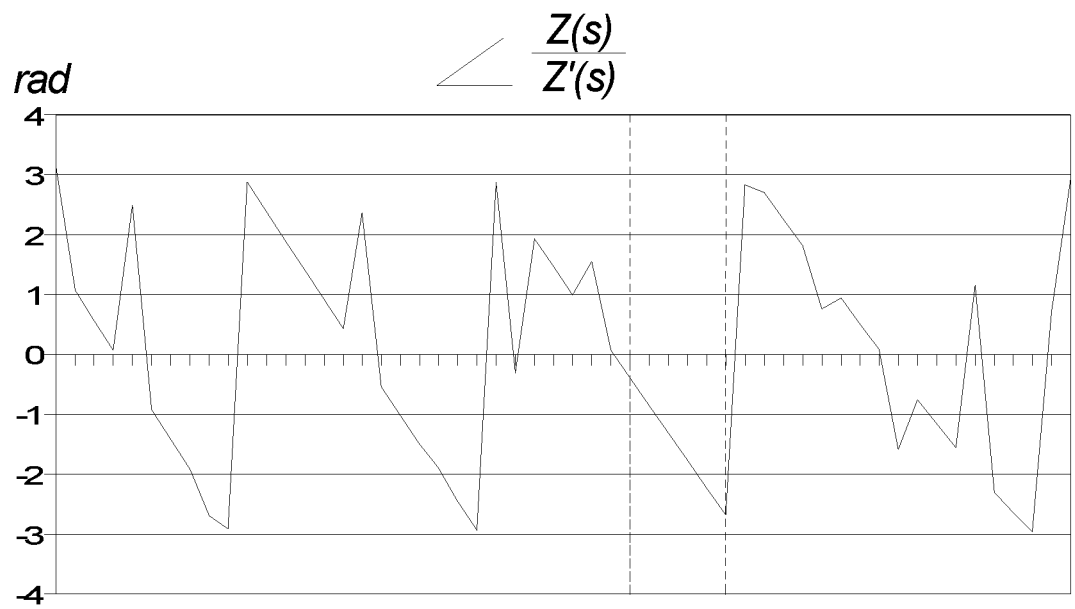
FIG. 21a illustrates the actual phase angles between the flow meter responses shown in FIG. 19.

The phase angles between Z(s) and Z'(s) for different frequencies are shown in the graph in FIG. 21*a*. In theory, this graph should correspond to the one shown in FIG. 18*b*, but it is obvious that this is not the case.

Looking closer at FIG. 21*a*, however, it emerges that the two graphs are not as different as it seems at the first glance. Whereas the graph in FIG. 18*b* is linear, the graph in FIG. 21*a* is characterised by a generally saw-toothed pattern due to the fact that the phase angles in this graph have been "wrapped" to fall within the range from −π rad to +π rad.

Figure 21B:
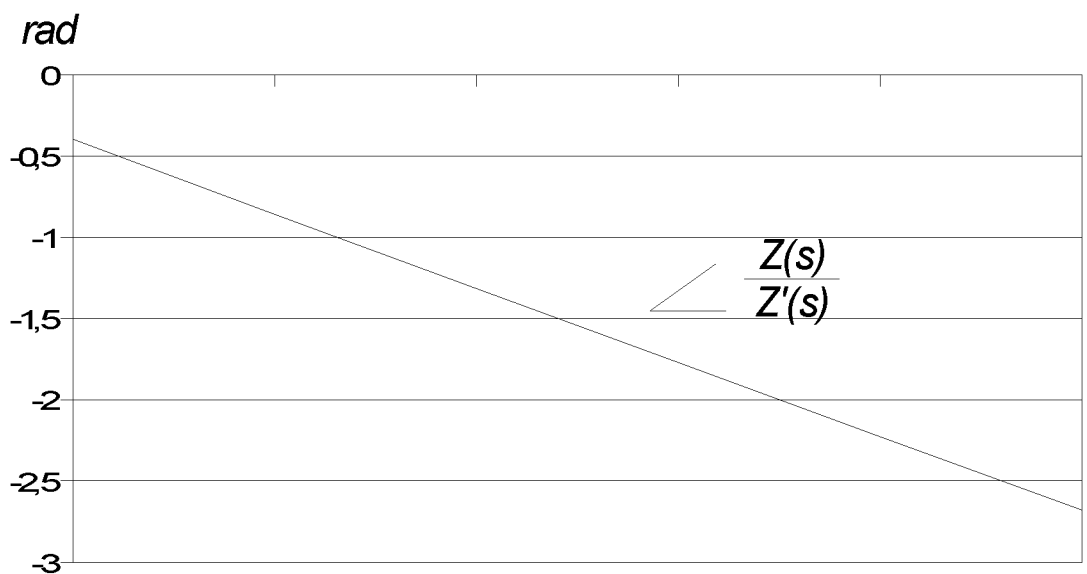
FIG. 21b illustrates a segment of the graph shown in FIG. 21a, FIG. 22 illustrates the slopes of the segment shown in FIG. 21b.

It is obvious that the saw-toothed pattern of the graph in FIG. 21*a* is overlaid by a certain amount of noise, which is mainly due to small magnitudes of Z(s) and/or Z'(s) affecting the calculations at some frequencies. However, the segment of the graph between the two dotted lines, corresponding to a frequency range with large magnitudes of Z(s) and Z'(s) as can be seen from FIGS. 20*a* and 20*b*, is very close to being linear. FIG. 21*b* shows an enlargement of this segment of the graph in FIG. 21*a*. It should be noted that the slope of the linear segment can be calculated by finding the phase angle between Z(s) and Z'(s) for only two different frequencies.

The slope at different frequencies of the graph segment in FIG. 21*b*, corresponding to the time delay $t_d$ of the ultrasonic signal in the flow path FP as described above, are shown in FIG. 22. The time unit on the vertical axis of this graph corresponds to the oscillation period of the transmission signal RESPms. Thus, according to FIG. 22, the measured flow meter response RESPms is delayed by 2.3 oscillation periods as compared to the emulated flow meter response RESPem, which is in perfect agreement with the two signal curves shown in FIG. 19.

Figure 22:
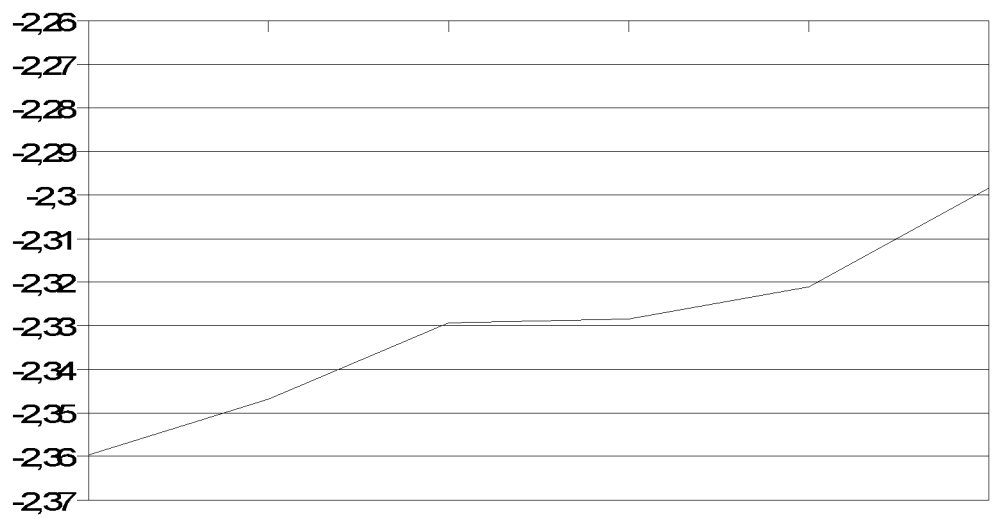

It should be noted that the variation of the calculated time delay $t_d$, i.e. of the slope of the graph segment in FIG. 22 is only a few percent of the oscillation period, which means that the time delay $t_d$ calculated by this method is very precise as compared to other methods known in the art.

In practice, the actual flow meter response RESPms is best measured using a transmission signal comprising a number of pulses, whereas the emulated flow meter response RESPem is easiest calculated through appropriate digital filtering of the single pulse response SPRSYS calculated as described above. This has no influence on the results obtained by the method.

Using methods like the ones described above, the absolute transit times, corresponding to $t_1$ and $t_2$ in Equation 1, can be determined independently of the transducer parameters with very high absolute accuracy (down to about 100 nanoseconds for 1 MHz transducers, which is significantly more precise than what is possible in all previously known systems).

Normally, flow meters according to the invention will perform flow metering at regular time intervals, typically in the range between 0.1 second and 5 seconds. However, it should be noted that, for instance in order to extend the life time of a battery supplying the electricity for a flow meter, the characterization of the transducers or the transmitted signal and the simulation of the flow meter system do not need to be repeated for every flow metering performed by the flow meter.

The transducer characteristics change slowly over time due to aging of the transducers TR1, TR2 and more spontaneously due to changes in the temperature of the fluid in the flow path FP in which they are arranged.

Thus, new transducer characterizations or signal characterizations and determination of an updated simulation model of the flow meter system for use in the calculation of absolute transit times may advantageously by performed at regular predetermined time intervals and/or when a change of temperature above a certain predetermine limit is detected, the temperature change being indicated by a change in the calculated transit time due to the dependency of ultrasound speed on the temperature of the medium in which the ultrasound propagates.

Due to the high costs (and the high power consumption) of very fast analogue-digital converters, slower converters may advantageously be used in flow meters according to the invention. However, as is well-known from the Nyquist theorem, if a signal is sampled at a frequency lower than twice the maximum frequency occurring in the signal, the analogue signal cannot be reconstructed without a certain distortion.

Thus, if a low sampling frequency is used for recording the electrical reception signal received by the receiver circuit of a flow meter according to the invention, the physical flow meter response signal will be distorted. If, however, the simulation model response is subjected to the same undersampling, a similar distortion of this signal will take place, and the two response signals can still be compared for finding a very precise measure of the absolute transit time as described above.

Figure 23A:
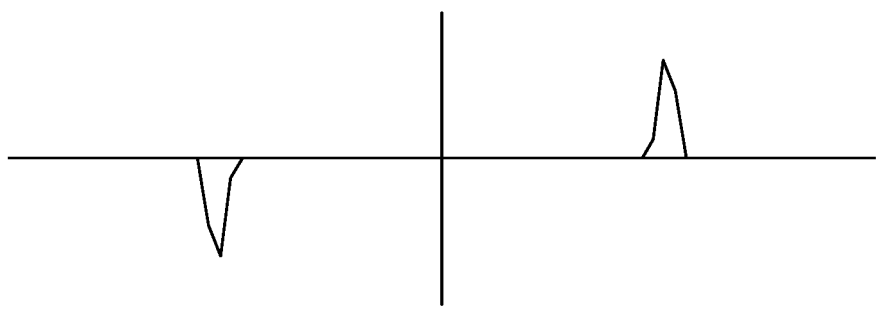
FIG. 23a illustrates an example of the frequency spectrum of a continuous signal.
Figure 23B:
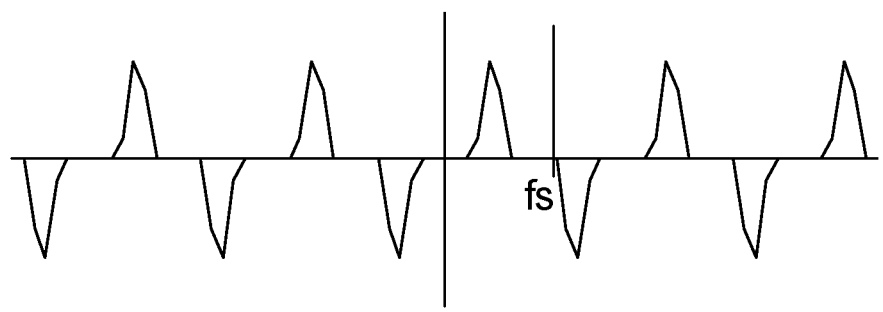
FIG. 23b illustrates schematically the spectral consequences of undersampling the continuous signal, whose frequency spectrum is illustrated in FIG. 23a, FIG. 23c illustrates schematically how the undersampled signal can be reconstructed by changing the sampling frequency and filtering the signal.
Figure 23C:
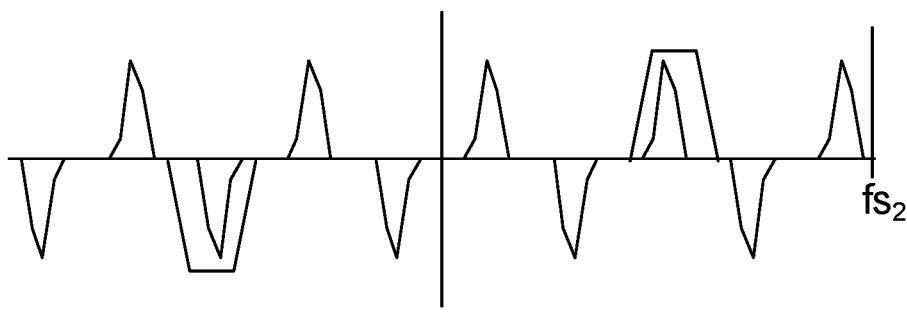

The well-known spectral consequences of undersampling a continuous signal are illustrated schematically in FIGS. 23a-c.

FIG. 23a illustrates an example of the frequency spectrum of a continuous signal, while FIG. 23b illustrates how undersampling (in this case with a sampling frequency fs of 5/6 of the signal frequency) results in the creation of an infinite number of aliases of the original spectrum.

FIG. 23c illustrates schematically how the undersampled signal can be reconstructed by changing the sampling frequency to the Nyquist sampling frequency $fs_2$ and filtering the signal with an FIR reconstruction filter, the frequency band of which is indicated in the figure.

The distortion of the reconstructions of undersampled continuous signals is illustrated schematically in FIGS. 24a-b and 25a-b.

Figure 24A:
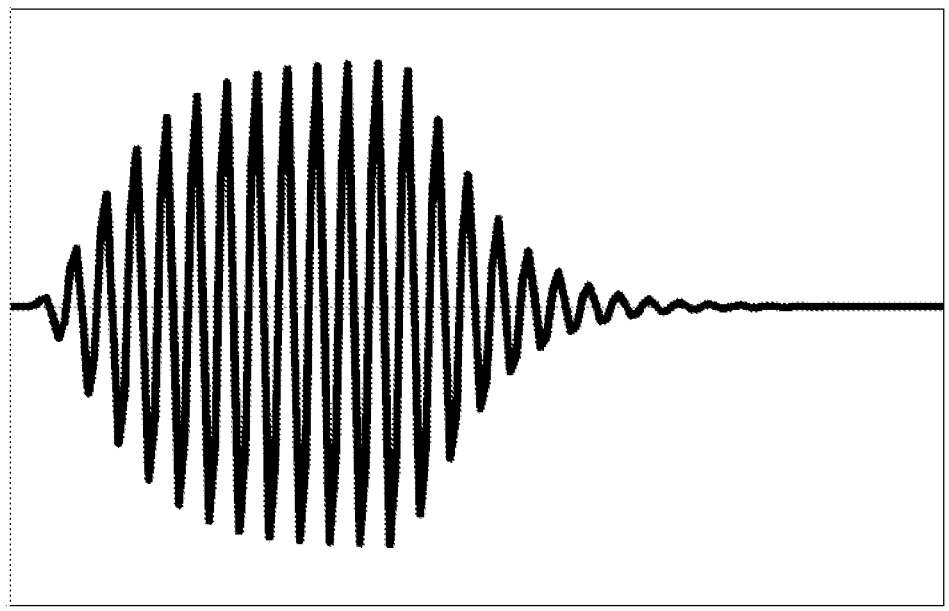
FIG. 24a illustrates an example of a continuous signal.
Figure 24B:
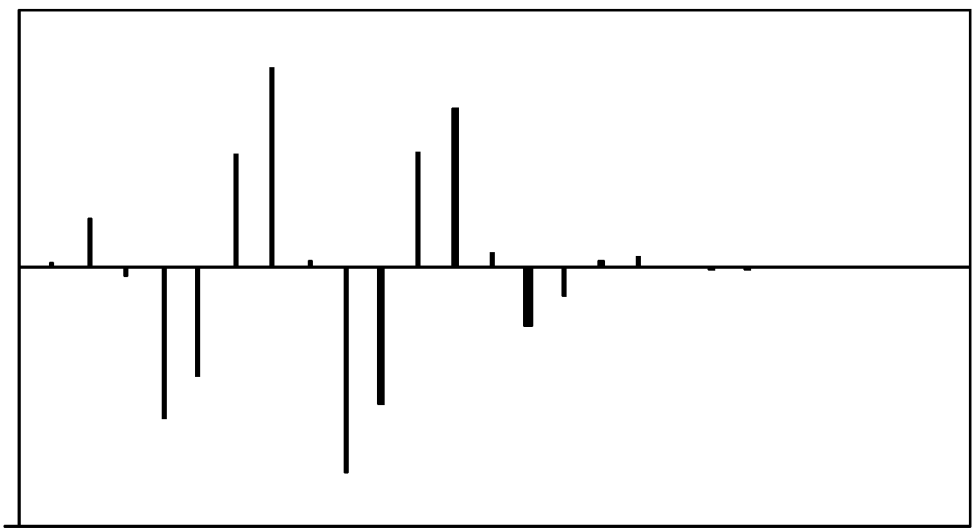
FIG. 24b illustrates the digital samples obtained by sampling the signal of FIG. 24a at a sampling frequency of 5/6 of the signal frequency.

FIG. 24a illustrates an example of a continuous signal, while FIG. 24b illustrates the digital samples obtained by sampling the continuous signal of FIG. 24a at a sampling frequency of 5/6 of the signal frequency.

Figure 25A:
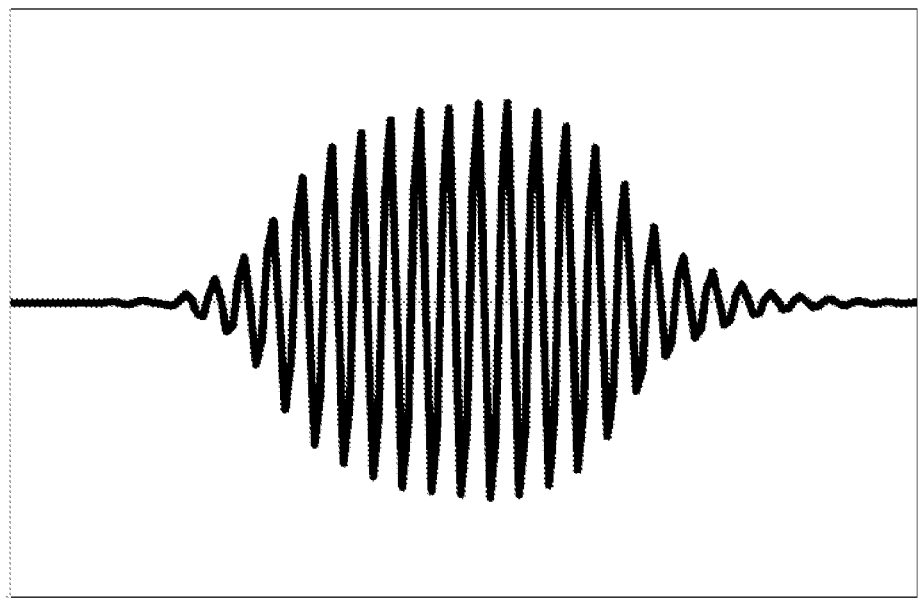
FIG. 25a illustrates the reconstruction of the signal of FIG. 24a using a wide band FIR reconstruction filter.
Figure 25B:
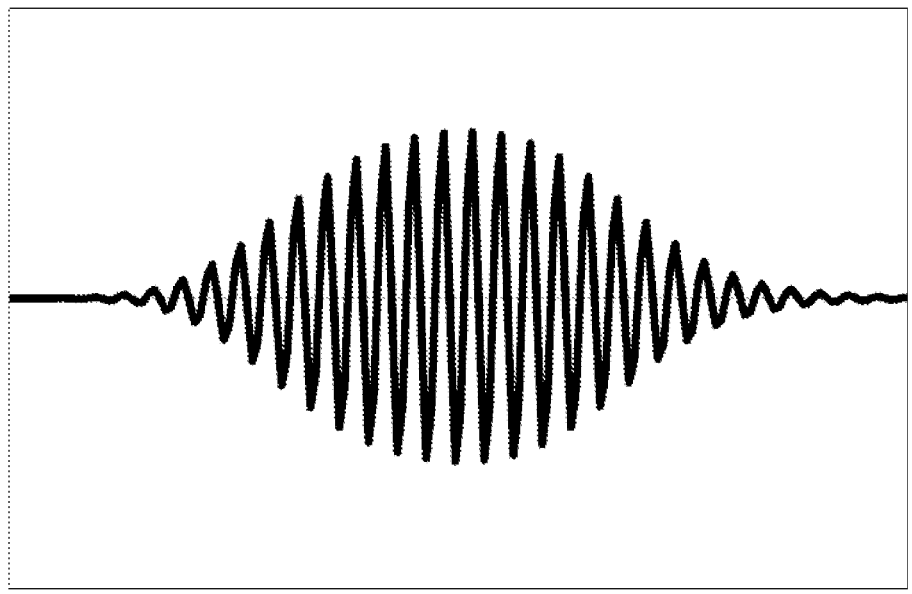
FIG. 25b illustrates the reconstruction of the same signal using a narrow band FIR reconstruction filter.

FIG. 25a illustrates the reconstruction of the signal of FIG. 24a using a wide band FIR reconstruction filter, whereas FIG. 25b illustrates the reconstruction of the same signal using a narrow band FIR reconstruction filter.

From comparing the reconstructed signals shown in FIGS. 25a and 25b to the original signal shown in FIG. 24a, it is clear that the use of a narrow band FIR reconstruction filter results in a more severe distortion of the signal than does the use of a wide band FIR reconstruction filter. The optimum band width of the FIR reconstruction filter to be used depends partly on the width of the individual aliases in the undersampled spectrum, partly on the amount of noise in the signal.

Figure 26:
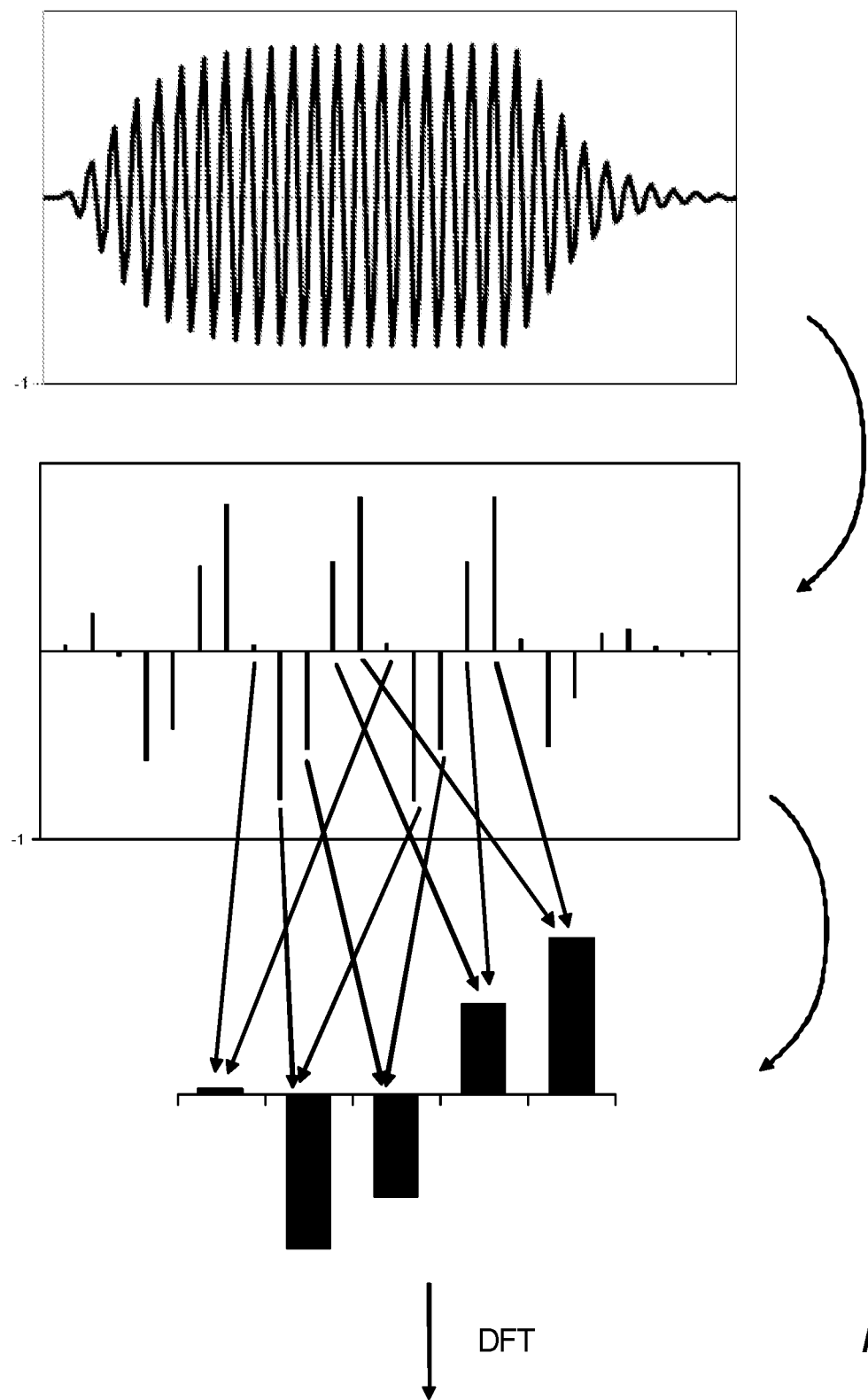
FIG. 26 illustrates schematically a method for finding the amplitude and phase of an undersampled continuous signal.

FIG. 26 illustrates schematically a method for finding the amplitude and phase of an undersampled continuous signal without using any FIR reconstruction filter.

The upper half of FIG. 26 comprises two frames illustrating a continuous signal and the digital samples obtained by sampling this continuous signal at a sampling frequency of 5/6 of the signal frequency, respectively.

The relation between the signal frequency and the sampling frequency means that for each sixth oscillations of the continuous signal, five samples will be collected. If the continuous signal is stationary, the five samples from a period of six oscillations will correspond exactly to the five samples from the previous six oscillations and to the five samples from the following six oscillations.

If a relatively long input signal is used, the midmost part of the signal can be considered to be substantially stationary as indicated in the upper half of FIG. 26, and the samples obtained from this part of the signal can be sorted out and summed up in five groups, each containing a number of "similar" samples from different periods of six oscillations of the continuous signal as illustrated in the lower half of FIG. 26.

If this sorting and summing up of samples is done in an appropriate way, these five groups of samples together form an "average sampling" of a single oscillation, which corresponds to a single oscillation of the substantially stationary part of the continuous signal and from which the amplitude and phase of the continuous signal can be determined by means of Digital Fourier Transformation DFT.

As mentioned above, the difference between the transit times of two different ultrasonic signals, corresponding to the quantity $(t_1-t_2)$ in Equation 1, can easily be found by comparing the phases of the corresponding two electrical reception signals received by the receiver circuit RC of the flow meter. Thus, in order to find this difference in a system using undersampling, the transmission signals should advantageously be relatively long, assuring that there is enough information in the samples from the substantially stationary part of the signal to determine the phase of the signal with a sufficient accuracy.

Figure 27:
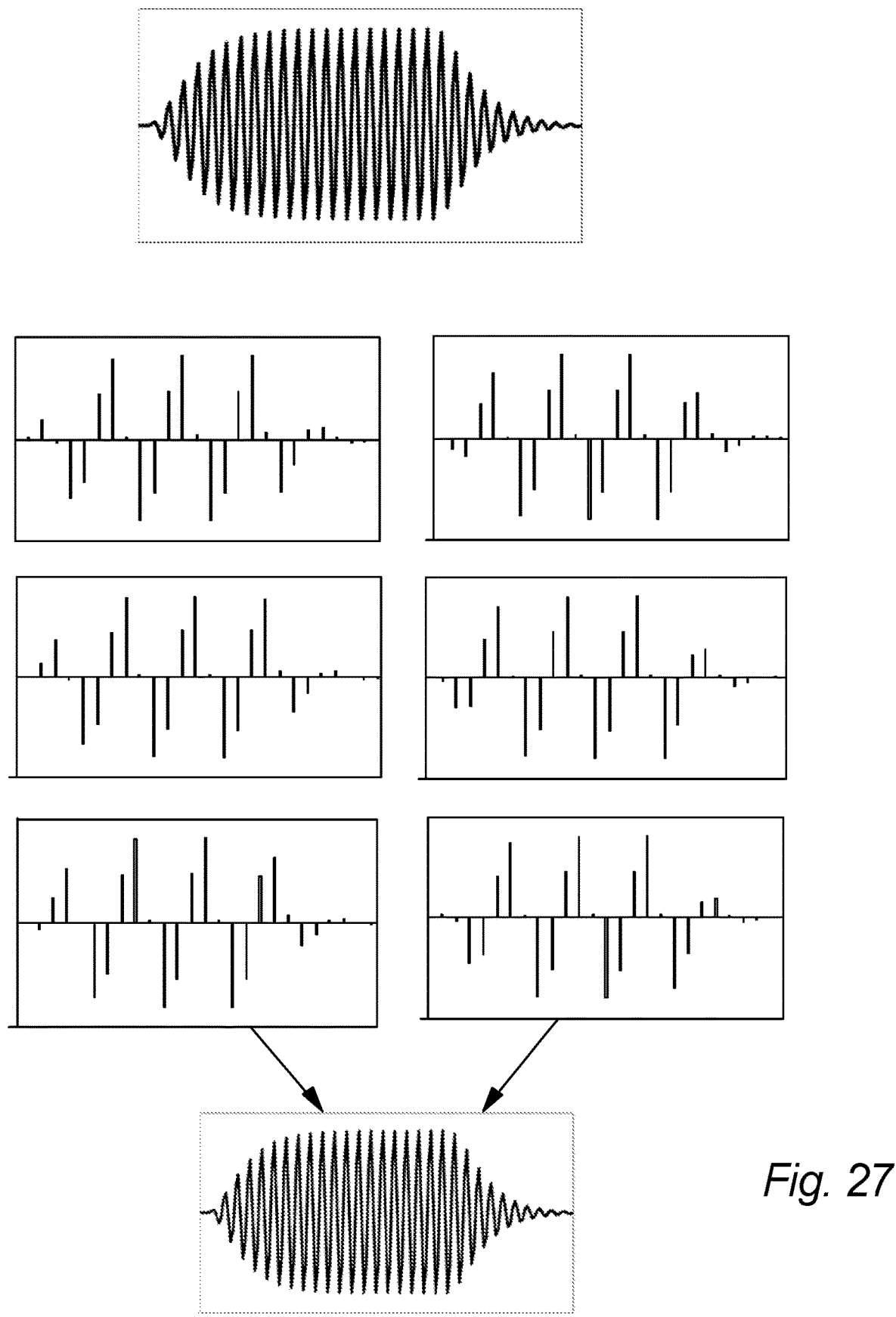
FIG. 27 illustrates schematically a method for reconstructing an undersampled continuous signal without distortion.

FIG. 27 illustrates schematically a method for reconstructing an undersampled continuous signal without distortion.

Again, the continuous signal, which is shown in the top of FIG. 27, is sampled with an analogue-digital converter working at a sampling frequency of 5/6 of the signal frequency. However, in this method, the signal is transmitted and sampled six times, the timing of the sampling being displaced corresponding to 1/5 of the oscillation period of the continuous signal, the resulting six sets of interleaved samples from which samplings are illustrated schematically in the central part of FIG. 27.

By combining the interleaved samples appropriately, samples corresponding to a sampling frequency of 5 times the signal frequency are obtained. Only two times the signal frequency needed (according to the Nyquist theorem), this is more than sufficient to reconstruct the signal without any distortion.

In order to determine precise values of the absolute transit times $t_1$ and $t_2$ to be added together to find the quantity $(t_1+t_2)$ in Equation 1, the transmission signals should advantageously be relatively sharp, short and well-defined.

Figure 28:
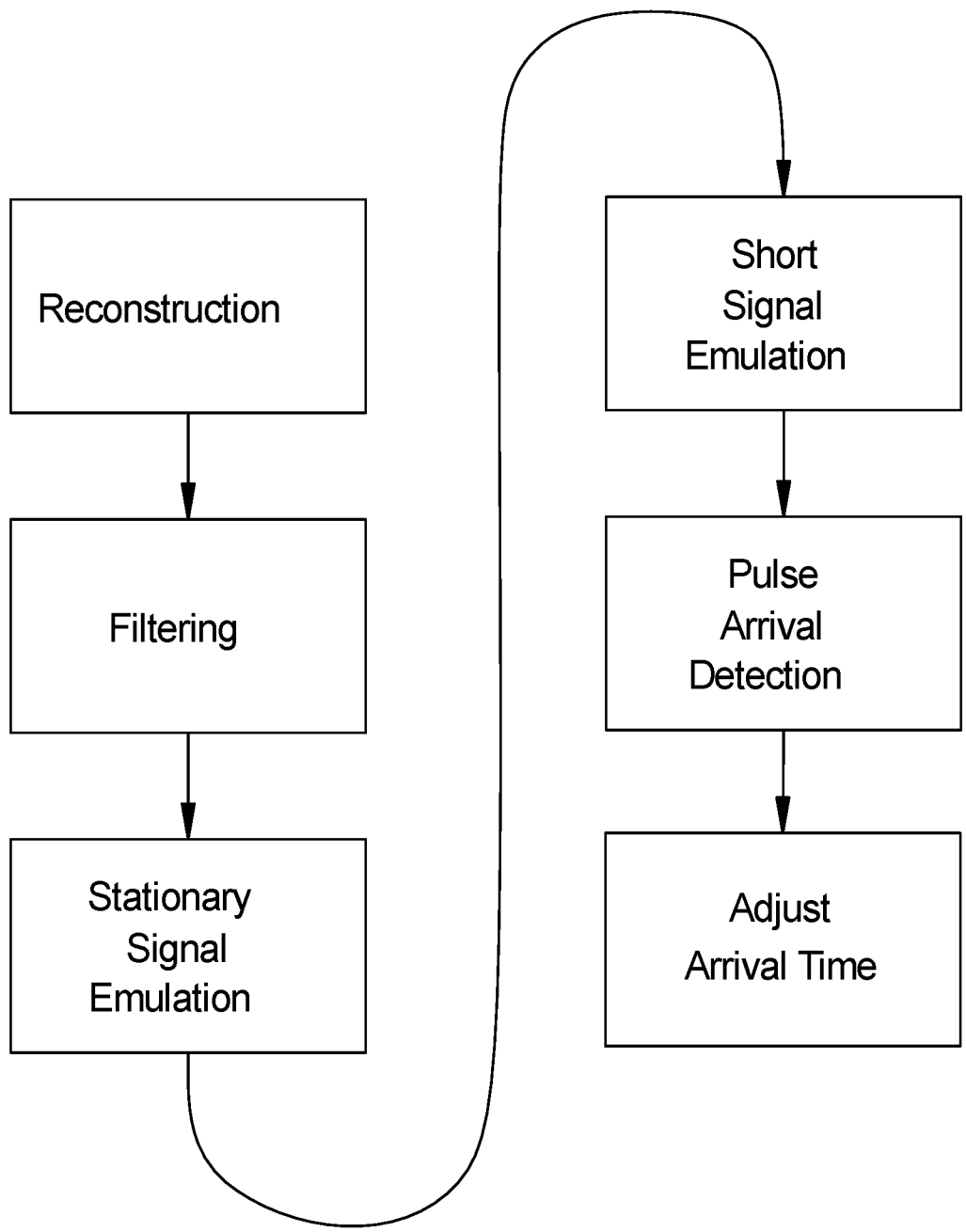
FIG. 28 illustrates schematically an extended method according to the invention for determining very precisely the time delay of the ultrasonic signal in the flow path.

Taking the above consideration into account, the digital signal processing on the physical and simulated model responses of a flow meter according to the invention in order to obtain a very precise value of the absolute transit time may be performed as illustrated schematically in FIG. 28.

First, if the signal is undersampled, upsampling and anti-alias filtering is performed in order to reconstruct the signal.

After that, an optional filtering including bandwidth limitation may be performed in order to improve the signal-noise ratio of the signal.

The relatively sharp, short and well-defined transmission signal, which is advantageous for obtaining a very precise absolute transit time determination, cf. the above, is emulated from the actual received and filtered signal in two steps:

The first emulation step consists in obtaining an emulated substantially stationary signal by adding to the received signal delayed versions of the signal itself. If, for instance, the transmitted signal contains five oscillations, versions of the received and filtered signal, which are delayed by five, ten, fifteen, etc. periods of the signal are added to the actually received and filtered signal. Due to the complete linearity of the system, the principle of superposition assures that the resulting signal is exactly similar to the filtered version of the signal that would have been received if the transmission signal had contained ten, fifteen, twenty, etc. oscillation periods.

The second emulation step consists in subtracting a delayed version of the emulated substantially stationary signal from the emulated substantially stationary signal itself. If, for instance, the subtracted signal is delayed by two periods of the signal, the principle of superposition assures that the resulting signal is exactly similar to the filtered version of the signal that would have been received if the transmission signal had contained two oscillation periods. If this subtraction had been done with two versions of the original received and filtered signal corresponding to a transmission signal containing only five oscillation periods, the resulting signal would be a signal corresponding to a transmitted signal having two pulses followed by a pause of three oscillation periods and then by another two pulses opposite in phase from the first two pulses. Obviously, such an odd signal would not be very suitable for the purpose.

Now, the envelope of the emulated short signal is calculated and the point of time, on which 50% of the maximum value of the envelope has been reached, is found as illustrated in FIG. 13.

Finally, the absolute transit time is determined by subtracting the corresponding point of time relating to the envelope of the simulation model response signal calculated from the transducer characteristics as described above.

It should be noted that the scope of the invention is in no way to be understood as being limited to the above-described embodiments of the invention, which are only to be seen as examples of a multitude of embodiments falling within the scope of the invention as defined by the below patent claims.

LIST OF REFERENCE SYMBOLS

CC. Common conductor for signal generator and receiver circuit
Cconn. Capacitor in connection between signal generator power supply and receiver circuit
Cpar. Parallel capacitor in equivalence diagram for ultrasonic transducer
Cpar1. Parallel capacitor in equivalence diagram for first ultrasonic transducer
Cpar2. Parallel capacitor in equivalence diagram for second ultrasonic transducer
Cser. Series capacitor in equivalence diagram for ultrasonic transducer
Cser1. Series capacitor in equivalence diagram for first ultrasonic transducer
Cser2. Series capacitor in equivalence diagram for second ultrasonic transducer
DFT. Digital Fourier Transformation
DPSa. First digital pulsating input signal
DPSb. Second digital pulsating input signal
Escs. Envelope of supply current signal
FP. Flow path for fluid flow
fs. Undersampling frequency
$fs_2$. Nyquist sampling frequency
Itr1. Current through first transducer in equivalence diagram
Itr2. Current through second transducer in equivalence diagram
Lser. Series inductor in equivalence diagram for ultrasonic transducer
Lser1. Series inductor in equivalence diagram for first ultrasonic transducer
Lser2. Series inductor in equivalence diagram for second ultrasonic transducer
OP. Operational amplifier common for signal generator and receiver circuit
OPrc. Operational amplifier in receiver circuit
OPrc1. Operational amplifier in first receiver circuit
OPrc2. Operational amplifier in second receiver circuit
OPsg. Operational amplifier in signal generator
Rbleed. Bleeder resistor for ultrasound transducer
RC. Receiver circuit
RCC. Current sensing resistor for power supply current
Rconn. Resistor in connection between signal generator power supply and receiver circuit
RESPem. Emulated flow meter response
RESPms. Measured flow meter response
Rfb,sg. Feedback resistance in signal generator
Rfilt. Filter resistance
Rser. Series resistor in equivalence diagram for ultrasonic transducer
Rser1. Series resistor in equivalence diagram for first ultrasonic transducer
Rser2. Series resistor in equivalence diagram for second ultrasonic transducer
SCSa. First half of supply current signal
SCSb. Second half of supply current signal
SCS−. Subtraction supply current signal
SCS+. Addition supply current signal
SG. Signal generator
SP. Single pulse
SPRSYS. Single pulse response of the system
SPRTR1. Single pulse response of first ultrasonic transducer
SPRTR2. Single pulse response of second ultrasonic transducer
SPSCS0. Single pulse supply current signal without any ultrasonic transducers
SPSCS1. Single pulse supply current signal for first ultrasonic transducer
SPSCS2. Single pulse supply current signal for second ultrasonic transducer
SPU. Signal processing unit
SU. Switching unit
SW. Switch
SW1. First switch
SW2. Second switch
SWconn. Switch in connection between signal generator power supply and receiver circuit
$t_d$. Time delay of ultrasonic signal in flow path
Tscs. Oscillation period of supply current signal
TR1. First ultrasonic transducer
TR2. Second ultrasonic transducer
TR. Ultrasonic transducer
VCC. Positive power supply voltage
Vtr1. Voltage impressed on first transducer in equivalence diagram
Vtr2. Voltage impressed on second transducer in equivalence diagram
Zad. Adaptation impedance
Zfb. Feedback impedance in combined signal generator and receiver circuit
Zfb,rc. Feedback impedance in receiver circuit
Zfb,rc1. Feedback impedance in first receiver circuit
Zfb,rc2. Feedback impedance in second receiver circuit
Zfb,sg. Feedback impedance in signal generator
Zfilt. Filter impedance Zsig. Signal impedance
$\alpha_1$. Damping coefficient relating to first ultrasonic transducer
$\alpha_2$. Damping coefficient relating to second ultrasonic transducer
$\omega_1$. Undampened angular oscillation frequency of first ultrasonic transducer
$\omega_2$. Undampened angular oscillation frequency of second ultrasonic transducer
$\omega_{D1}$. Dampened angular oscillation frequency of first ultrasonic transducer
$\omega_{D2}$. Dampened angular oscillation frequency of second ultrasonic transducer

What is claimed is:

1. An ultrasonic flow meter comprising at least one ultrasonic transducer and a signal generator for generating electrical signals to the at least one transducer, the signal generator comprising an active component,
    wherein the ultrasonic flow meter comprises a current measuring arrangement configured to measure at least one power supply current to said active component of said signal generator to establish at least one supply current signal, and
    wherein said current measuring arrangement comprises an impedance inserted in series between a source of a positive or negative supply voltage and the active component.

2. The ultrasonic flow meter of claim 1, wherein said current measuring arrangement comprises a resistor inserted in series between a source of a positive supply voltage and the active component.

3. The ultrasonic flow meter of claim 1, wherein said current measuring arrangement comprises a resistor inserted in series between a source of a negative supply voltage and the active component.

4. The ultrasonic flow meter of claim 1, wherein said ultrasonic flow meter is arranged to feed a pulsating input signal to said signal generator to generate said electrical signal to the at least one transducer.

5. The ultrasonic flow meter of claim 1, wherein said ultrasonic flow meter is arranged to feed a single pulse input signal to said signal generator to generate said electrical signal to the at least one transducer.

6. The ultrasonic flow meter of claim 1, wherein said at least one transducer is at least two transducers and wherein said ultrasonic flow meter is arranged to perform said measure at least one power supply current to said active component of said signal generator at least one time for each of said at least two transducers to establish at least one supply current signal for each of said at least two transducers.

7. The ultrasonic flow meter of claim 1, wherein said ultrasonic flow meter is arranged to calculate an emulated flow meter response on the basis of said at least one supply current signal.

8. The ultrasonic flow meter of claim 1, wherein said ultrasonic flow meter is arranged to calculate an emulated flow meter response on the basis of at least one transducer characterizing quantity determined from said at least one supply current signal.

9. The ultrasonic flow meter of claim 8, wherein said at least one transducer characterizing quantity determined from said at least one supply current signal comprises at least one of
    an oscillation period, and
    a damping coefficient.

10. The ultrasonic flow meter of claim 9, wherein said at least one transducer characterizing quantity is determined from a dampened oscillation part of one or more of said at least one supply current signals or a signal derived therefrom.

11. The ultrasonic flow meter of claim 1, wherein said at least one transducer is at least two transducers and wherein said ultrasonic flow meter is a transit time based ultrasonic flow meter arranged to use said established at least one supply current signal together with a measured flow meter response to determine an absolute transit time of an ultrasonic signal in a flow path of said ultrasonic flow meter.

12. The ultrasonic flow meter of claim 1, wherein said at least one transducer is at least two transducers and wherein said ultrasonic flow meter is a transit time based ultrasonic flow meter arranged to use a measured flow meter response together with an emulated flow meter response calculated from said established at least one supply current signal to determine an absolute transit time of an ultrasonic signal in a flow path of said ultrasonic flow meter.

13. The ultrasonic flow meter of claim 1, wherein said at least one transducer is at least two transducers and wherein said ultrasonic flow meter is a transit time based ultrasonic flow meter arranged to use a measured flow meter response together with an equivalence model of said at least two transducers determined from transducer characterizing quantities determined from said established at least one supply current signal to determine an absolute transit time of an ultrasonic signal in a flow path of said ultrasonic flow meter.

14. The ultrasonic flow meter of claim 1, wherein said at least one transducer is at least two transducers and wherein said ultrasonic flow meter is a transit time based ultrasonic flow meter arranged to calculate an indication of a flow of fluid in a flow path of said ultrasonic flow meter on the basis of at least one absolute transit time determined from said at least one supply current signal.

15. An ultrasonic flow metering method for an ultrasonic flow meter comprising at least one ultrasonic transducer and a signal generator with an active component for generating electrical signals to the at least one transducer, the ultrasonic flow metering method comprising the steps of:
    measuring at least one power supply current to said active component of said signal generator; and
    establishing at least one supply current signal based on said measuring,
    wherein the ultrasonic flow meter includes a current measuring arrangement that comprises an impedance inserted in series between a source of a positive or negative supply voltage and the active component, and
    wherein the measuring measures via the current measuring arrangement.

16. The ultrasonic flow metering method of claim 15, wherein said measuring at least one power supply current comprises measuring a voltage across at least one current sensing resistor arranged in series between said active component of said signal generator and at least one voltage supply of said signal generator.

17. The ultrasonic flow metering method of claim 15, comprising the step of feeding a pulsating input signal to said signal generator to generate said electrical signal to the at least one transducer.

18. The ultrasonic flow metering method of claim 15, comprising the step of feeding a single pulse input signal to said signal generator to generate said electrical signal to the at least one transducer.

19. The ultrasonic flow metering method of claim 15, wherein said at least one transducer is at least two transducers and wherein said ultrasonic flow metering method comprises the step of repeating said step of measuring at least one power supply current to said active component of said signal generator to establish at least one supply current signal for each of said at least two transducers.

20. The ultrasonic flow metering method of claim 15, comprising the step of calculating an emulated flow meter response on the basis of said at least one supply current signal.

21. The ultrasonic flow metering method of claim 15, comprising the step of calculating an emulated flow meter response on the basis of at least one transducer characterizing quantity determined from said at least one supply current signal.

22. The ultrasonic flow metering method of claim 21, wherein said at least one transducer characterizing quantity determined from said at least one supply current signal comprises at least one of
   an oscillation period, and
   a damping coefficient.

23. The ultrasonic flow metering method of claim 22, wherein said at least one transducer characterizing quantity is determined from a dampened oscillation part of one or more of said at least one supply current signals or a signal derived therefrom.

24. The ultrasonic flow metering method of claim 15, wherein said at least one transducer is at least two transducers and wherein said ultrasonic flow meter is a transit time based ultrasonic flow meter, the ultrasonic flow metering method comprising the step of
   measuring a flow meter response; and
   determining an absolute transit time of an ultrasonic signal in a flow path of said ultrasonic flow meter using said established at least one supply current signal and said measured flow meter response.

25. The ultrasonic flow metering method of claim 15, wherein said at least one transducer is at least two transducers and wherein said ultrasonic flow meter is a transit time based ultrasonic flow meter, the ultrasonic flow metering method comprising the step of
   calculating and emulated flow meter response from said established at least one supply current signal;
   measuring a flow meter response; and
   determining an absolute transit time of an ultrasonic signal in a flow path of said ultrasonic flow meter using said emulated flow meter response and said measured flow meter response.

26. The ultrasonic flow metering method of claim 15, wherein said at least one transducer is at least two transducers and wherein said ultrasonic flow meter is a transit time based ultrasonic flow meter, the ultrasonic flow metering method comprising the step of
   determining at least one transducer characterizing quantity from said at least one supply current signal for each of said at least two transducers;
   determining an equivalence model of said at least two transducers from said at least one transducer characterizing quantity for each of said at least two transducers;
   measuring a flow meter response; and
   determining an absolute transit time of an ultrasonic signal in a flow path of said ultrasonic flow meter using said equivalence model and said measured flow meter response.

27. The ultrasonic flow metering method of claim 15, wherein said at least one transducer is at least two transducers and wherein said ultrasonic flow meter is a transit time based ultrasonic flow meter, the ultrasonic flow metering method comprising the step of
   measuring at least one flow meter response;
   determining at least one absolute transit time using said at least one supply current signal and said at least one measured flow meter response; and
   calculating an indication of a flow of fluid in a flow path of said ultrasonic flow meter using said at least one absolute transit time.

\* \* \* \* \*